(12) United States Patent
Mochizuki et al.

(10) Patent No.: US 9,969,266 B2
(45) Date of Patent: May 15, 2018

(54) DISPLAY CONTROL DEVICE, PROJECTION DEVICE, AND NON-TRANSITORY STORAGE MEDIUM FOR VEHICLE SPEED LIMIT NOTIFICATIONS

(71) Applicant: Panasonic Intellectual Property Management Co., Ltd., Osaka (JP)

(72) Inventors: Makoto Mochizuki, Kanagawa (JP); Koichi Emura, Kanagawa (JP); Shigeru Kobayashi, Tokyo (JP); Takenori Matsumoto, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/183,812

(22) Filed: Jun. 16, 2016

(65) Prior Publication Data

US 2017/0001522 A1    Jan. 5, 2017

(30) Foreign Application Priority Data

Jul. 2, 2015    (JP) ................................. 2015-133434

(51) Int. Cl.
*G08G 1/0967*    (2006.01)
*B60K 35/00*    (2006.01)
(Continued)

(52) U.S. Cl.
CPC .............. *B60K 35/00* (2013.01); *G06T 11/60* (2013.01); *G08B 21/06* (2013.01); *G08G 1/0962* (2013.01);
(Continued)

(58) Field of Classification Search
None
See application file for complete search history.

(56) References Cited

U.S. PATENT DOCUMENTS 9,035,796 B2    5/2015    Pilutti et al.
2002/0003571 A1*    1/2002    Schofield ................ B60C 23/00
                                                            348/148
(Continued)

FOREIGN PATENT DOCUMENTS

JP    2009-187166    8/2009

OTHER PUBLICATIONS

The Extended European Search Report dated Dec. 8, 2016 for the related European Patent Application No. 16174125.1.

*Primary Examiner* — Xiao Wu
*Assistant Examiner* — Steven Elbinger
(74) *Attorney, Agent, or Firm* — Greenblum & Bernstein, P.L.C.

(57) ABSTRACT

In a display control device, in accordance with speed limit information input from an input unit, a control unit senses change in a speed limit of a road where a vehicle travels and after that, in accordance with vehicle information input from the input unit, determines whether or not whether necessity to increase conspicuity of notification of the change in the speed limit. When it is determined that the necessity is high, a display unit is caused to switch display on a display medium from a first presentation image to a second presentation image that indicates a second speed limit by a first switching method. When it is determined that the necessity is not high, the display of the first presentation image is switched to the display of the second presentation image by a second switching method different from the first switching method.

11 Claims, 11 Drawing Sheets

(51) Int. Cl.
*G06T 11/60* (2006.01)
*G08B 21/06* (2006.01)
*G08G 1/0962* (2006.01)
*G08G 1/16* (2006.01)

(52) U.S. Cl.
CPC ....... *G08G 1/0967* (2013.01); *G08G 1/09623* (2013.01); *G08G 1/096716* (2013.01); *G08G 1/161* (2013.01); *G08G 1/166* (2013.01); *B60K 2350/352* (2013.01); *B60K 2350/402* (2013.01); *B60K 2350/962* (2013.01)

(56) References Cited

U.S. PATENT DOCUMENTS

| | | | |
|---|---|---|---|
| 2006/0290482 A1* | 12/2006 | Matsumoto | B60Q 1/2665 340/436 |
| 2009/0096597 A1* | 4/2009 | Avery, Jr. | G08G 1/0962 340/435 |
| 2009/0195411 A1 | 8/2009 | Ichihashi et al. | |
| 2010/0045452 A1* | 2/2010 | Periwal | B60Q 9/00 340/439 |
| 2010/0231372 A1* | 9/2010 | Sandstrom | B60K 35/00 340/459 |
| 2011/0060496 A1* | 3/2011 | Nielsen | G06Q 10/0631 701/31.4 |
| 2013/0113633 A1* | 5/2013 | Pilutti | G08G 1/096716 340/905 |
| 2015/0187195 A1* | 7/2015 | Ujike | G08B 29/181 340/693.1 |

* cited by examiner

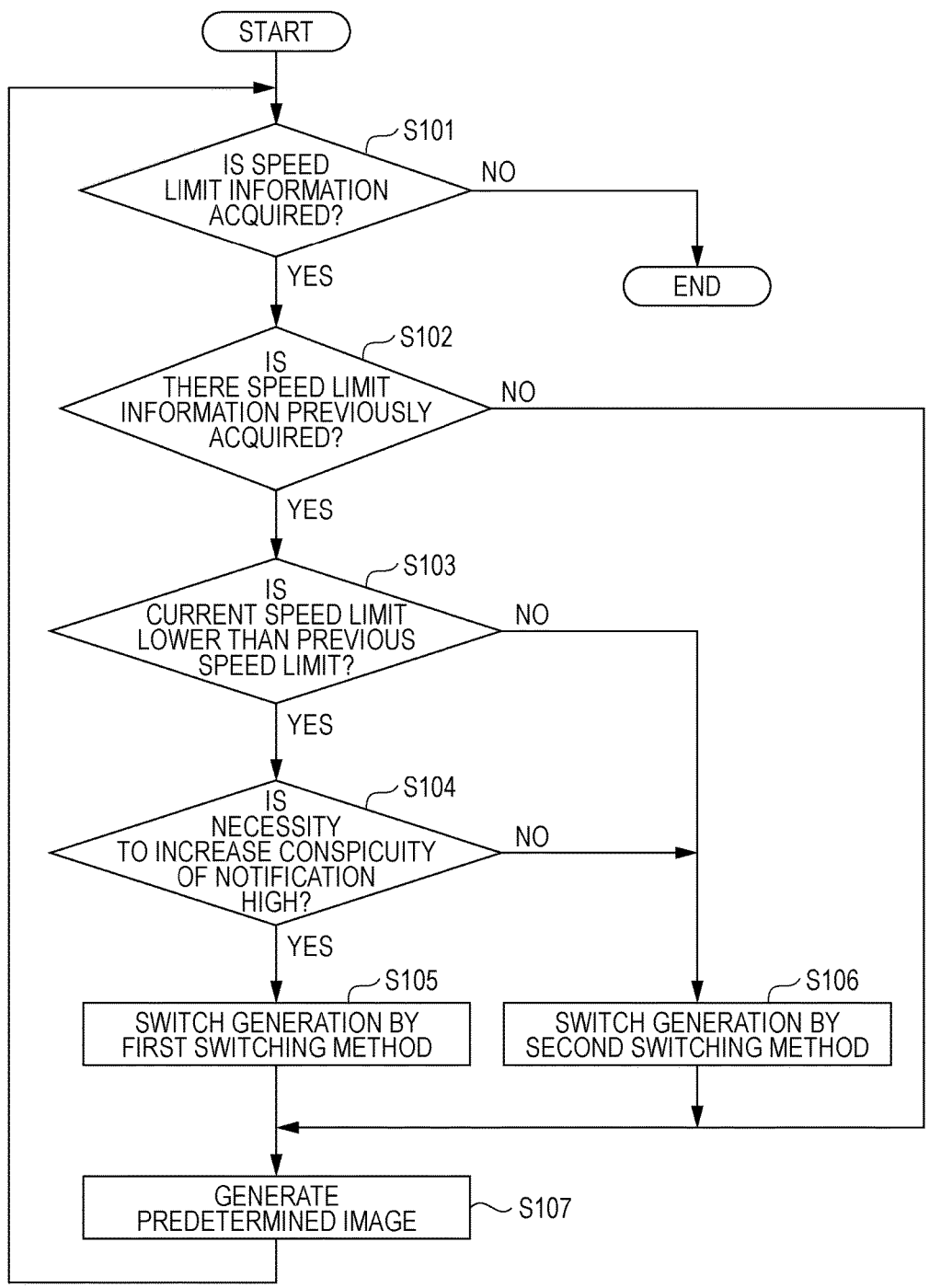

DISPLAY CONTROL DEVICE, PROJECTION DEVICE, AND NON-TRANSITORY STORAGE MEDIUM FOR VEHICLE SPEED LIMIT NOTIFICATIONS

BACKGROUND

1. Technical Field

The present disclosure relates to a display control device, a projection device, and a non-transitory storage medium, which control display of information provided to an occupant of a vehicle or the like.

2. Description of the Related Art

Development of a drive support system that prevents overspeed by acquiring speed limit information of a road where a vehicle travels using an image, such as a traffic sign acquired by a vehicle-mounted camera, and conveying the acquired speed limit information to an occupant has been promoted in recent years. Such a drive support system is disclosed in, for example, Japanese Unexamined Patent Application Publication No. 2009-187166, which is hereinafter referred to as the conventional art.

In the conventional art, the speed limit of a lane where a vehicle travels, which is hereinafter referred to as the travel lane, is identified and an image that indicates the identified speed limit is superimposed on a map image, and the resultant is displayed on a display medium. Further in the conventional art, the speed limit of an adjacent lane, which is a lane adjacent to the travel lane, is identified and an image that indicates the identified speed limit of the adjacent lane is superimposed on the map image, and the resultant is displayed on the display medium. Accordingly, the driver of the vehicle can be informed of the speed limit of each lane.

However, the conventional art is undesirable in terms of the visibility of the speed limit information, which relates to the switch of an image that indicates the speed limit on the display medium.

SUMMARY

One non-limiting and exemplary embodiment provides enhancement in the visibility of a speed limit displayed on the display medium.

In one general aspect, the techniques disclosed here feature a display control device including: an input unit that receives vehicle information including at least one of information on a vehicle, intra-vehicle information, and extra-vehicle information and receives information on a speed limit of a road where the vehicle travels; and a controller that controls a image generator generating a predetermined image based on the vehicle information and the information on the speed limit and outputting the predetermined image to a display medium, where the predetermined image represents a presentation image that indicates the speed limit when displayed on the display medium, and the controller causes the image generator to generate a first predetermined image representing a first presentation image that indicates a first speed limit, senses change in the speed limit of the road where the vehicle travels from the first speed limit to a second speed limit lower than the first speed limit, after sensing the change in the speed limit, determines whether or not necessity to increase conspicuity of notification of the change in the speed limit is high in accordance with the vehicle information, and when it is determined that the necessity to increase the conspicuity of the notification is high, using the image generator, causes display on the display medium to be switched by a first switching method from the first presentation image to a second presentation image that indicates the second speed limit, or when it is determined that the necessity to increase the conspicuity of the notification is not high, causes the display on the display medium to be switched by a second switching method different from the first switching method from the first presentation image to the second presentation image.

According to an aspect of the present disclosure, the visibility of a speed limit displayed on the display medium may be enhanced.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a flowchart that illustrates an operation example of the display system according to embodiment 1 of the present disclosure;

DETAILED DESCRIPTION

In a conventional drive support system, speed limit information presented to an occupant on a display medium is changed uniformly when the speed limit of a road where a vehicle travels is switched. Thus, there are issues about visibility, such as a possibility that the occupant fails to notice the switch of the speed limit information when necessary or a possibility that the occupant feels visually hindered by the switch of the speed limit information when not particularly necessary. Embodiments of the present disclosure described below address such issues to enhance the visibility of speed limit information displayed on a display medium.

Embodiment 1

Embodiment 1 of the present disclosure is described with reference to the drawings.

Figure 1:
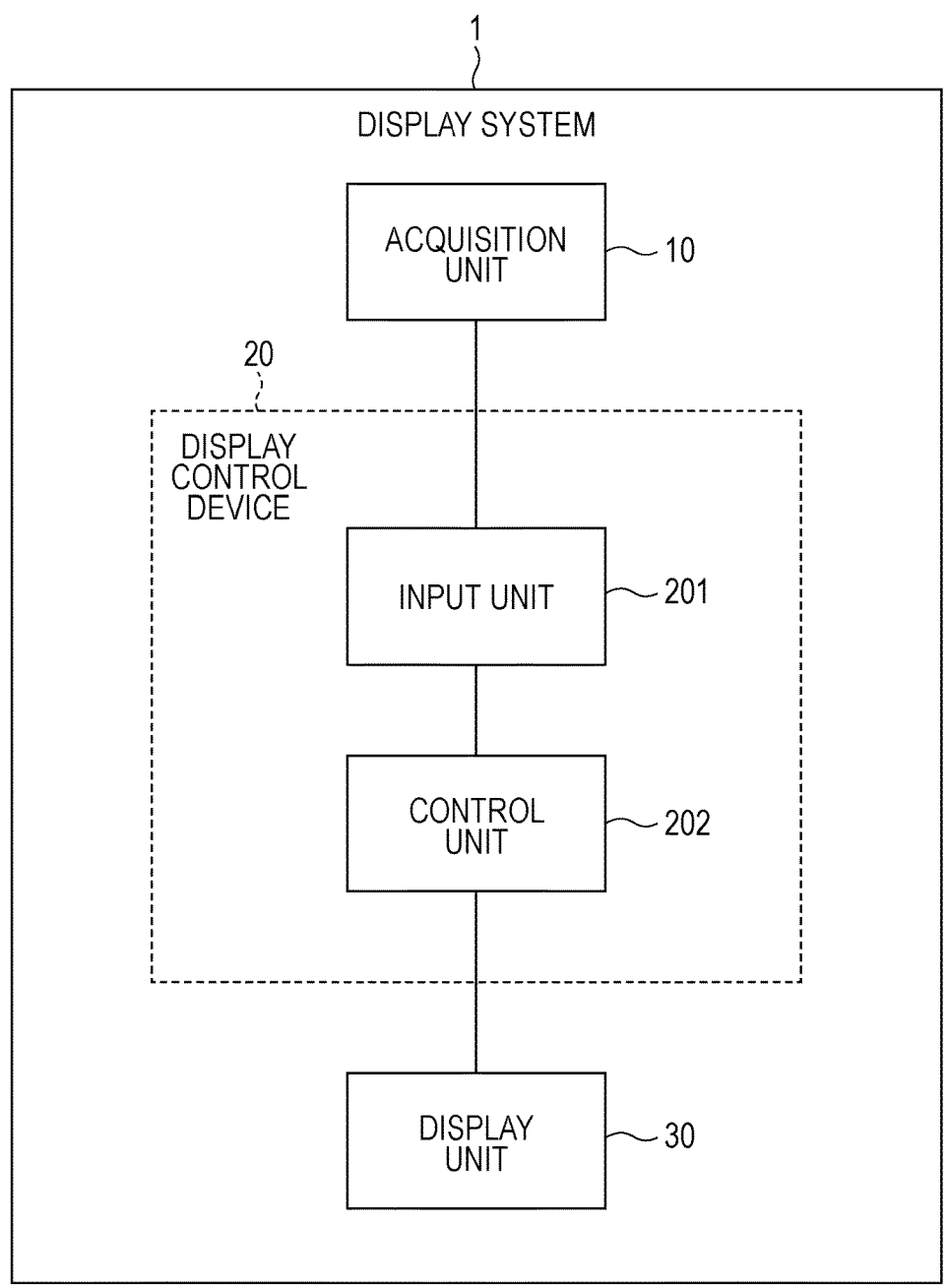
FIG. 1 is a block diagram that illustrates a configuration example of a display system according to embodiment 1 of the present disclosure.

First, a configuration example of a display system 1 according to the present embodiment is described using FIG. 1. FIG. 1 is a block diagram that illustrates the configuration example of the display system 1 according to the present embodiment.

For example, the display system 1 is used in a mobile unit, such as a vehicle, and is a system that supports driving of the vehicle. The display system 1 may be a vehicle-mounted device or may be a device that is carried into the vehicle. In addition, although the present embodiment describes an example in which the user is an occupant of the vehicle and particularly describes an example in which the user is the driver of the vehicle, the user is not limited thereto. Further, the display system 1 may be used in a wearable computer, such as a head-mounted or helmet-mounted display (HMD) described below, which the user can wear on his or her body.

In FIG. 1, the display system 1 includes an acquisition unit 10, a display control device 20, and a display unit 30. The display control device 20 includes an input unit (a receiver) 201 and a control unit 202.

The acquisition unit 10 acquires information on a speed limit of a road where a vehicle travels. Specifically, the acquisition unit 10 acquires speed limit information at a predetermined timing. The speed limit information is information that indicates the speed limit of the road, which is 30 km/h, 50 km/h, or the like for example. Examples of the road mentioned herein include a road of a predetermined section, a vehicular lane, and a road in an area for which a speed limit is prescribed in advance.

It is assumed in the present embodiment, as an example, that the speed limit information is correlated with each road section included in map information in advance and is stored in a predetermined storage device together with the map information. The predetermined storage device may be provided in the display system 1 or may be provided outside the display system 1. For example, the acquisition unit 10 acquires the speed limit information from the predetermined storage device each time the road section where the vehicle travels is switched.

Further, the acquisition unit 10 acquires vehicle information at the predetermined timing in addition to the speed limit information. As described above, the speed limit information indicates the information on the speed limit of the road where the vehicle travels. The vehicle information indicates at least one of information on the vehicle, intra-vehicle information, and extra-vehicle information.

Examples of the information on the vehicle include traveling speed information, which indicates the traveling speed of the vehicle, acceleration information, which indicates the acceleration of the vehicle, and relative speed information, which indicates the relative speed to a vehicle near the vehicle.

Examples of the intra-vehicle information include wakefulness degree information, which indicates the degree of the wakefulness of the driver in the vehicle, age information, which indicates the age of the driver, and driving skill information, which indicates whether the driving skills of the driver are high or low.

Examples of the extra-vehicle information include notification information, which indicates notification to the driver, such as the represented content of a traffic sign, and presence information, which indicates that an attention attraction object, such as a pedestrian or a preceding vehicle, is present near the vehicle. The notification information and the presence information may be information related to an advanced driving assistant system (ADAS).

Examples of the predetermined timing include regular timings or a timing at which change in the speed limit is detected, which is described below. When change in the speed limit, that is, decrease or increase in the speed limit is detected, the acquisition unit 10 may autonomously acquire the vehicle information or the acquisition unit 10 may acquire the vehicle information in accordance with control by the control unit 202, which is described below, and how the acquisition unit 10 acquires the vehicle information does not limit the scope of the present disclosure.

The display unit 30 generates a predetermined image based on the information acquired in the acquisition unit 10 and causes the predetermined image to be displayed on a display medium, which is not illustrated. Specifically, the display unit 30 generates an image based on control information of the control unit 202 and projects the generated image onto the display medium.

The predetermined image may be an image or may be image data. When the display unit 30 has a projecting function, the predetermined image is an image and the display unit 30 projects the predetermined image onto the display medium. When the display unit 30 has no projecting function, the display unit 30 generates image data and outputs the image data to the display medium.

When the display unit 30 has the projecting function, the display medium is for example, a head-up display (HUD). In this case, the display unit 30 projects the predetermined image onto the display medium and causes the occupant of the vehicle to recognize the predetermined image as a virtual image. Hereinafter, the present disclosure describes projecting the predetermined image onto the display medium and causing the occupant to recognize the predetermined image as a virtual image in the same meaning as displaying the predetermined image onto the display medium. That is, in the description below, it is expressed as display that a predetermined image is projected onto a HUD and visually recognized by the occupant as a virtual image.

For example, the display unit 30 has the projecting function and directly projects the generated image onto the HUD, which is the display medium. As a result, the image is displayed on the HUD. The display unit 30 may cause the HUD to display the virtual image using the principle of a hologram for example, instead of using the projecting function. When the hologram is used, a scheme may be employed, which uses a light guide plate to guide light by performing total internal reflection on a group of parallel light beams satisfying conditions of the total internal reflection of the light guide plate. Although in the scheme using a light guide plate, image data does not undergo direct projection, which is performed in a projector, the definition of the projection or display similar to the definition in the scheme using a projector is utilized in the description for convenience of explanation.

The display medium is not limited to the HUD. For example, a liquid crystal display (LCD), the HUD, an HMD, an eyeglass-type display (smart glasses), a navigation display, a meter display, or another special-purpose display is applicable to the display medium. The HUD may be for example, a windshield of a vehicle or may be a glass surface, a plastic surface, or the like, which is provided extra. The windshield may be for example, a front glass, a side glass, or a back glass of the vehicle. In any of the above-mentioned cases, an image is displayed on the display medium.

When the display unit 30 has no projecting function, the display medium is for example, a transmission-type display, and the predetermined image that the display unit 30 generates is image data. That is, the display unit 30 causes a transmission-type display to display a presentation image, which is a visible image, by outputting image data to the transmission-type display.

For example, the transmission-type display is a transmission-type organic electroluminescent (EL) display or a transparent display using a glass that emits light under irradiation of light with a specific wavelength, and the driver may visually recognize the background and the display on the transmission-type display at the same time. The transmission-type display is a display medium that allows light to pass through the display medium. The principle of displaying the image data input to the transmission-type display as a presentation image is known and the description of the principle is omitted.

In the present embodiment, output is defined as a superordinate concept of projection.

The input unit 201 receives the speed limit information and the vehicle information from the acquisition unit 10. The control unit 202 controls the display unit 30 that generates a predetermined image based on the speed limit information and the vehicle information and outputs the predetermined image to the display medium. The predetermined image represents a presentation image that indicates a speed limit when displayed on the display medium.

The presentation image that indicates the speed limit, which is mentioned here, may be an image of only numeric information on the speed limit or may be an image that includes numeric information on the speed limit like a sign. Further, the presentation image that indicates the speed limit is an image displayed on the display medium. The predetermined image is an image generated in the display unit 30. That is, the image that is displayed on the display medium while indicating the speed limit and the predetermined image are substantially the same in content.

The control unit 202 causes the display unit 30 to generate a first predetermined image representing a first presentation image, which is a visible image indicating a first speed limit. Further, the control unit 202 senses change in the speed limit of the road where the vehicle travels, which is for example, change from the first speed limit to a second speed limit lower than the first speed limit.

After that, in accordance with the vehicle information that the input unit 201 has received from the acquisition unit 10, the control unit 202 determines whether necessity to increase the conspicuity of notification of the change from the first speed limit to the second speed limit, which may be merely referred to as the "necessity" hereinafter, is high or low.

When it is determined that the necessity is high, the control unit 202 uses the display unit 30 to switch the display on the display medium from the first presentation image to a second presentation image, which indicates the second speed limit, by a first switching method. For example, the first switching method is the switching method described below with reference to FIGS. 3A, 4A, 5A, 6A, 7A, and 8A.

In contrast, when it is determined that the necessity is not high, the control unit 202 switches the display from the first presentation image to the second presentation image by a second switching method, which is different from the first switching method. For example, the second switching method is the switching method described below with reference to FIGS. 3B, 4B, 5B, 6B, 7B, and 8B.

Specifically, when the input unit 201 receives second speed limit information that indicates the second speed limit lower than the first speed limit after having received information on the first speed limit, the control unit 202 senses change in the speed limit, which is decrease in the speed limit in this case, and determines the necessity to increase the conspicuity of the notification of the change in the speed limit in accordance with the vehicle information that the input unit 201 has received from the acquisition unit 10.

A determination method of the necessity to increase the conspicuity of the notification of change in the speed limit, which is based on the vehicle information, is described below.

Described first is a case where the vehicle information that the input unit 201 has received from the acquisition unit 10 is the traveling speed information that indicates the traveling speed of the vehicle, as an example.

The control unit 202 determines the necessity to increase the conspicuity of the notification of the change in the speed limit in accordance with the relation between the traveling speed of the vehicle and the first speed limit and the relation between the traveling speed of the vehicle and the second speed limit lower than the first speed limit, which are based on values.

Specifically, when the traveling speed of the vehicle is equal to or lower than the second speed limit, the necessity to increase the conspicuity of the notification of the change in the speed limit is low. This is because when the speed limit changes from the second speed limit to the first speed limit, the state of abiding by the speed limit remains unchanged and the necessity for the driver to change the traveling speed is low.

In contrast, the traveling speed of the vehicle is equal to or lower than the first speed limit and higher than the second speed limit, the necessity to increase the conspicuity of the notification of the change in the speed limit is high. This is because when the speed limit changes from the first speed limit to the second speed limit, the state of abiding by the speed limit changes to the state of violating the speed limit and the necessity for the driver to change the traveling speed is high.

Accordingly, when the traveling speed of the vehicle is equal to or lower than the second speed limit, the control unit 202 determines that the necessity to increase the conspicuity of the notification of the change in the speed limit is not high, or when the traveling speed of the vehicle is equal to or lower than the first speed limit and is higher than the second speed limit, the necessity to increase the conspicuity of the notification of the change in the speed limit is high.

When the traveling speed of the vehicle is higher than the first speed limit, the necessity is set in accordance with a design specification. When, for example, the traveling speed of the vehicle is higher than the first speed limit and the speed limit changes to the second speed limit, the degree of the speed limit violation increases and thus, the necessity to increase the conspicuity of the notification of the change in the speed limit may be set to be high. When, however, the traveling speed of the vehicle exceeds the speed limit and attention is attracted by another vehicle-mounted device, the necessity to increase the conspicuity of the notification of the change in the speed limit may be lowered. This is because the state of violating the speed limit remains unchanged.

Described below is a case where the vehicle information that the input unit 201 has received from the acquisition unit 10 is the acceleration information that indicates the acceleration of the vehicle, as an example.

When the speed limit of the road where the vehicle travels decreases from the first speed limit to the second speed limit, the control unit 202 determines the necessity to increase the conspicuity of the notification of the change in the speed limit in accordance with whether the vehicle accelerates, that is, the acceleration is positive or whether the vehicle decelerates, that is, the acceleration is negative.

Specifically, when the speed limit decreases and the vehicle decelerates, the necessity to increase the conspicuity of the notification of the change in the speed limit is low. This is because even when the speed limit decreases, the traveling speed of the vehicle also decreases and in such a case, making the notification of the change in the speed limit conspicuous annoys the driver.

In contrast, when the speed limit decreases and the vehicle accelerates or travels at a constant speed, the necessity to increase the conspicuity of the notification of the change in the speed limit is high. This is because there is a high possibility that the speed limit will be exceeded.

Thus, when the vehicle decelerates, the control unit 202 determines that the necessity to increase the conspicuity of the notification of the change in the speed limit is not high, or when the vehicle accelerates or the vehicle travels at a constant speed, the control unit 202 determines that the necessity to increase the conspicuity of the notification of the change in the speed limit is high.

Described below is a case where the vehicle information that the input unit 201 has received from the acquisition unit 10 is the relative speed information that indicates the relative speed to a preceding vehicle of the vehicle, as an example.

When the speed limit of the road where the vehicle travels decreases from the first speed limit to the second speed limit, the control unit 202 determines the necessity to increase the conspicuity of the notification of the change in the speed limit in accordance with whether the relative speed of the vehicle to the preceding vehicle is positive or negative.

Specifically, when the speed limit decreases and the relative speed is negative or zero, the necessity to increase the conspicuity of the notification of the change in the speed limit is low. This is because as the speed limit decreases, the distance between the vehicle and the preceding vehicle increases and the possibility of collision becomes low.

In contrast, when the speed limit decreases and the relative speed is positive or zero, the necessity to increase the conspicuity of the notification of change in the speed limit is high. This is because as the speed limit decreases, the distance between the vehicle and the preceding vehicle decreases and the possibility of collision becomes high.

Thus, when the relative speed is negative, the control unit 202 determines that the necessity to increase the conspicuity of the notification of the change in the speed limit is not high, or when the relative speed is positive, the control unit 202 determines that the necessity to increase the conspicuity of the notification of the change in the speed limit is high.

The traveling speed information and the acceleration information, which are described above, may be acquired as, for example, controller area network (CAN) information on the vehicle. Further, the above-described relative speed information is calculated on the basis of, for example, the traveling speed of the vehicle and the traveling speed of the preceding vehicle, which are acquired by, for example, an image sensor or a radar, or through radio communication. The acquisition methods of the traveling speed information, the acceleration information, and the relative speed information are known and are not limited to the examples mentioned herein, or do not limit the scope of the present disclosure.

Described below is a case where the vehicle information that the input unit 201 has received from the acquisition unit 10 is the wakefulness degree information that indicates the degree of the wakefulness of the driver in the vehicle, as an example.

When the wakefulness degree of the driver estimated by a sleepiness estimation device, which is not illustrated, is equal to or larger than a predetermined value, the control unit 202 determines that the wakefulness degree is high, or when the wakefulness degree is smaller than the predetermined value, the control unit 202 determines that the wakefulness degree is low.

After that, when the speed limit of the road where the vehicle travels decreases from the first speed limit to the second speed limit, the control unit 202 determines the necessity to increase the conspicuity of the notification of the change in the speed limit in accordance with whether the wakefulness degree of the driver of the vehicle is high, that is, the driver is awake, or the wakefulness degree of the driver of the vehicle is low, that is, the driver has sleepiness.

Specifically, when the speed limit decreases and the wakefulness degree is high, the necessity to increase the conspicuity of the notification of the change in the speed limit is low. This is because it is highly likely that the driver whose wakefulness degree is high is aware of the speed limit indicated in a traffic environment.

In contrast, when the speed limit decreases and the wakefulness degree is low, the necessity to increase the conspicuity of the notification of change in the speed limit is high. This is because it cannot necessarily be said that it is highly likely that the driver whose wakefulness degree is low is aware of the speed limit indicated in the traffic environment.

Thus, when the wakefulness degree is equal to or larger than the predetermined value, the control unit 202 determines that the necessity to increase the conspicuity of the notification of the change in the speed limit is not high, or when the wakefulness degree is smaller than the predetermined value, the control unit 202 determines that the necessity to increase the conspicuity of the notification of the change in the speed limit is high.

When the vehicle travels by automatic operation, the driver is synonymous with a supervisor. In such a case, the supervisor of the automatic operation needs to take over the initiative of the driving when the automatic operation is switched to the manual operation. Thus, although the supervisor needs to grasp the speed limit, when the wakefulness degree of the supervisor is low, it cannot necessarily be said that it is highly likely that the supervisor is aware of the switch of the speed limit. Accordingly, when the wakefulness degree of the supervisor is low, the necessity to increase the conspicuity of notifying the supervisor that the speed limit has been changed is high.

The sleepiness estimation device that estimates the wakefulness degree of an occupant, such as the driver or supervisor, is in the conventional art and may perform estimation from a face image acquired by an image sensor or from sensing results acquired by a myoelectric sensor, and the sleepiness estimation device does not limit the scope of the present disclosure.

Described below is a case where the vehicle information that the input unit 201 has received from the acquisition unit 10 is the notification information that indicates the notification to the driver of the vehicle, such as ADAS-related information, as an example.

When the speed limit of the road where the vehicle travels decreases from the first speed limit to the second speed limit, the control unit 202 determines the necessity to increase the conspicuity of the notification of the change in the speed limit in accordance with whether or not the notification information is present.

Specifically, when for example, the notification information is present, the necessity to increase the conspicuity of the notification of the change in the speed limit is low. This is because it is desired that the notification information be notified with the higher priority than the change in the speed limit in view of safety.

In contrast, when no notification information is present, the necessity to increase the conspicuity of the notification of the change in the speed limit is high. This is because when no notification information is present, even when there is entertainment-related information for example, it is desired that the change in the speed limit, which affects safety driving, be notified with the higher priority than the entertainment-related information.

Thus, when the information that indicates notification to an occupant of the vehicle is present, the control unit 202 determines that the necessity to increase the conspicuity of the notification of the change in the speed limit is not high, or when the information that indicates notification to the occupant of the vehicle is not present, the control unit 202 determines that the necessity to increase the conspicuity of the notification of the change in the speed limit is high.

Described below is a case where the vehicle information that the input unit 201 has received from the acquisition unit 10 is the age information that indicates the age of the driver of the vehicle, as an example.

When the speed limit of the road where the vehicle travels decreases from the first speed limit to the second speed limit, the control unit 202 determines the necessity to increase the conspicuity of the notification of the change in the speed limit in accordance with whether the age of the driver is higher or lower than a predetermined age.

Specifically, when the age of the driver is lower than a predetermined value, the necessity to increase the conspicuity of the notification of the change in the speed limit is low. This is because when the age of the driver is low, the driver generally has a high attention attraction ability.

In contrast, when the age of the driver is equal to or higher than the predetermined value, the necessity to increase the conspicuity of the notification of the change in the speed limit is high. This is because when the age of the driver is high, the attention attraction ability of the driver is generally low.

Accordingly, when the vehicle information is the age information and when the age is lower than the predetermined value, the control unit 202 determines that the necessity to increase the conspicuity of the notification of the change in the speed limit is not high, or when the age is equal to or higher than the predetermined value, the control unit 202 determines that the necessity to increase the conspicuity of the notification of the change in the speed limit is high.

The age information of the driver may be set in advance or may be estimated from a face image acquired by an image sensor, and the age information of the driver does not limit the scope of the present disclosure.

Described below is a case where the vehicle information that the input unit 201 has received from the acquisition unit 10 is the driving skill information that indicates whether the driving skills of the driver of the vehicle are high or low, as an example.

When a level regarding the driving skills of the driver estimated by a driving skill estimation device, which is not illustrated, such as the number of times that sudden braking operations are performed, is lower than a predetermined value, the control unit 202 determines that the driving skills are high, or when the level regarding the driving skills, such as the number of times that sudden braking operations are performed, is equal to or higher than the predetermined value, the control unit 202 determines that the driving skills are low.

After that, when the speed limit of the road where the vehicle travels decreases from the first speed limit to the second speed limit, the control unit 202 determines the necessity to increase the conspicuity of the notification of the change in the speed limit in accordance with whether the driving skills of the driver are high or low.

Specifically, when the driving skills of the driver are high, the necessity to increase the conspicuity of the notification of the change in the speed limit is low. This is because when the driving skills of the driver are high, safer driving may be performed with lead time before a braking operation for example.

In contrast, when the driving skills of the driver are low, the necessity to increase the conspicuity of the notification of the change in the speed limit is high. This is because when the driving skills of the driver are low, a sudden braking operation is possible, which may be dangerous.

Thus, when the driving skills are high, the control unit 202 determines that the necessity to increase the conspicuity of the notification of the change in the speed limit is not high, or when the driving skills are low, the control unit 202 determines that the necessity to increase the conspicuity of the notification of the change in the speed limit is high.

The driving skill estimation device that estimates the driving skills of the driver may perform the estimation from, for example, the number of times that the steering wheel is suddenly operated, and the driving skill estimation device does not limit the scope of the present disclosure.

Described below is a case where the vehicle information that the input unit 201 has received from the acquisition unit 10 is the presence information that indicates an attention attraction object, such as a pedestrian, present near the vehicle, as an example.

When the speed limit of the road where the vehicle travels decreases from the first speed limit to the second speed limit, the control unit 202 determines the necessity to increase the conspicuity of the notification of the change in the speed limit in accordance with whether or not an attention attraction object, such as a pedestrian, is present ahead of the vehicle.

Specifically, when a pedestrian or the like is present ahead of the vehicle, the necessity to increase the conspicuity of the notification of the change in the speed limit is low. This is because the driver needs to pay more attention to the pedestrian or the like ahead of the vehicle than to the change in the speed limit in view of traffic safety.

In contrast, when no pedestrian or the like is present ahead of the vehicle, the necessity to increase the conspicuity of the notification of the change in the speed limit is high. This is because when the driver does not need to pay attention to any pedestrian or the like ahead of the vehicle, the driver needs to pay attention to the change in the speed limit in view of traffic safety.

Thus, when an attention attraction object is present, the control unit 202 determines that the necessity to increase the conspicuity of the notification of the change in the speed limit is not high, or when no attention attraction object is present, the control unit 202 determines that the necessity to increase the conspicuity of the notification of the change in the speed limit is high.

The presence of an attention attraction object ahead of the vehicle may be sensed by an image sensor or various radars or may be sensed through radio communication with a radio communication terminal held by a pedestrian or another vehicle, and the sensing method of an attention attraction object does not limit the scope of the present disclosure.

The determination method of the necessity to increase the conspicuity of the notification of the change in the speed limit, which is based on the vehicle information, is described above.

When it is determined that the necessity to increase the conspicuity of the notification of the change in the speed limit is high, the control unit 202 performs switch by a first switching method, which is set in advance, from control for causing the display unit 30 to generate the first predetermined image and causing the display medium to display the first presentation image to control for causing the display unit 30 to generate a second predetermined image that represents the image indicating the second speed limit when displayed on the display medium and causing the display medium to display the second presentation image.

In contrast, when it is determined that the necessity to increase the conspicuity of the notification of the change in the speed limit is not high, the control unit 202 performs switch by the second switching method, which is different from the first switching method, from the control for causing the display unit 30 to generate the first predetermined image and causing the display medium to display the first presentation image to the control for causing the display unit 30 to generate the second predetermined image and causing the display medium to display the second presentation image.

The control unit 202 controls the display unit 30 by outputting control information, which indicates an instruction for the above-described switch of the control and the contents of the switched control, to the display unit 30.

The display system 1 may include the above-described display medium. The display system 1 may be configured as a projection device by causing the display unit 30 to be included in the display control device 20.

The predetermined image is an image with a design set in advance and may be for example, a traffic sign indicating a speed limit or may be an image that expresses the speed limit information as digital indication using a seven-segment display or the like.

The first predetermined image or the second predetermined image described above may be generated by the display control device 20 or another constituent that is not illustrated instead of being generated by the display unit 30.

For example, the first presentation image or the second presentation image is visually recognized by the driver as a virtual image. At this time, the first presentation image or the second presentation image may be projected on the display medium so as to be superimposed on the driver's view. The principle that the image projected on the display medium is visually recognized by the driver as a virtual image is known and the description of the principle is omitted.

A configuration example of the display system 1 according to the present embodiment is described above.

An operation example of the display system 1 according to the present embodiment is now described with reference to FIG. 2. FIG. 2 is a flowchart that illustrates the operation example of the display system 1 according to the present embodiment. The process of FIG. 2 is performed when the road section where the vehicle travels is switched. For example, FIG. 2 illustrates the process that the display system 1 performs when the vehicle enters another road section from a predetermined road section. The road sections mentioned herein may be distinguished as for example, a straight road, an intersection where the vehicle makes a right or left turn from the straight road, and a straight road where the vehicle travels after making the right or left turn. The road section may be for example, a road link. The road link may be managed in accordance with identification (ID) of each road. In the description below, the road link is described as an example of the road section.

First, the control unit 202 determines whether or not the input unit 201 has acquired speed limit information from the acquisition unit 10 (step S101).

When the input unit 201 has acquired no speed limit information (step S101: NO), the process ends. In this case, from step S101, the process in FIG. 2 is performed again after a lapse of predetermined time.

When the input unit 201 has acquired speed limit information (step S101: YES), the control unit 202 determines whether or not there is the speed limit information that had been previously acquired (step S102). For example, in accordance with switch of the road link where the vehicle travels, the acquisition unit 10 acquires the speed limit information of the road after the switch.

When there is not the speed limit information that had been previously acquired, that is, there is not the information on the first speed limit (step S102: NO), the control unit 202 causes the display unit 30 to generate the first predetermined image (step S107). After that, the process returns to step S101.

The first predetermined image is, for example, a first image 101 or 103 in FIGS. 3A to 8B, which are described below.

When there is the speed limit information that had been previously acquired, that is, the information on the first speed limit (step S102: YES), the control unit 202 determines whether or not the speed limit that has been acquired this time, which is referred to as the current speed limit or the second speed limit, is lower than the speed limit that had been previously acquired, which is referred to as the previous speed limit or the first speed limit (step S103).

When the speed limit that has been acquired this time is not lower than the speed limit that had been previously acquired (step S103: NO), the process proceeds to step S106, which is described below.

In contrast, when the speed limit that has been acquired this time is lower than the speed limit that had been previously acquired (step S103: YES), the control unit 202 determines whether the necessity to increase the conspicuity of the notification of the change in the speed limit is high (step S104). This determination method is described above.

When it is determined that the necessity to increase the conspicuity of the notification is high (step S104: YES), the control unit 202 uses the display unit 30 to perform switch by a first switching method from generation of the first predetermined image to generation of a second predetermined image that represents a second presentation image indicating the speed limit acquired this time (step S105).

In the first switching method, the control unit 202 performs control for causing the driver to recognize the switch of the speed limit information more easily. This is because, in such a case, the relation between the traveling speed and the speed limit changes and the attention of the driver needs to be attracted. Examples of the switch of the control by the first switching method are described below with reference to FIGS. 3A to 8B. The second predetermined image is, for example, the second image 102 or 104 in FIGS. 3A to 8B, which are described below.

In contrast, when it is determined that the necessity to increase the conspicuity of the notification is not high (step 104: NO), the control unit 202 uses the display unit 30 to perform switch by a second switching method different from the first switching method from generation of the first predetermined image to generation of the second predetermined image (step S106).

In the second switching method, the control unit 202 performs control for not bringing visual hindrance caused by the switch of the speed limit information to the driver. This is because when in such a case, the driver desirably keeps driving at an optimum speed while being aware of the speed limit so as not to disturb the traffic flow of other vehicles. Examples of the switch of the control by the second switching method are described below with reference to FIGS. 3A to 8B.

The above-described first speed limit is the speed limit of the first road section where the vehicle has been traveling immediately before traveling on the current second road section. The first speed limit is different from the second speed limit. At least before the input unit 201 receives the second speed limit information, the control unit 202 controls the display unit 30 so that the first predetermined image is generated in accordance with the first speed limit information. The first predetermined image represents the first presentation image that indicates the first speed limit when displayed on the display medium. After that, the display unit 30 causes the first presentation image to be displayed on the display medium in accordance with the control by the control unit 202.

After that, the display unit 30 generates an image according to the control information from the control unit 202 and outputs the image to the display medium.

In the description above, the image that indicates the first speed limit may be displayed on the display medium during the travel of the vehicle on the first road link, and the image that indicates the first speed limit may stop being displayed on the display medium when the vehicle starts to travel on the second road link. That is, a first timing at which the road where the vehicle travels is switched from the first road link to the second road link and a second timing at which the image that indicates the first speed limit stops being displayed on the display medium are desirably simultaneous but need not necessarily be simultaneous, depending on delay in processing time of a device or the like. The first timing may be earlier or later than the second timing, and the timings do not limit the scope of the present disclosure.

Although the case where the acquisition unit 10 acquires the second speed limit information that indicates the second speed limit different from the first speed limit after acquiring the first speed limit information is taken as an example in the description above, there is also a case where the speed limit information acquired by the acquisition unit 10 remains unchanged even when the road section is switched. In such a case, the control unit 202 may use the speed limit information that the input unit 201 has received from the acquisition unit 10 in determining whether or not the speed limit has changed (see step S103 in FIG. 2). The acquisition unit 10 may output no information to the input unit 201 for the reason that the speed limit information remains unchanged. The processing performed when the speed limit remains unchanged even after the road section has been switched may be carried out by another method and the processing does not limit the scope of the present disclosure.

An operation example of the display system 1 according to the present embodiment is described above.

Specific examples of the switch of the control or the image displayed on the display medium by the first switching method and the second switching method explained with steps S105 and S106 in FIG. 2 are described below with reference to FIGS. 3A to 8B.

In FIGS. 3A to 8B, the vertical axis indicates the luminance of an image displayed on the display medium, which is a relative value based on a given value, while the horizontal axis indicates time during which an image indicating a speed limit is displayed on the display medium. Time T1 indicates time during which the first images 101 and 103 that indicate the first speed limit are displayed on the display medium. Time T2 indicates time during which the second images 102 and 104 that indicate the second speed limit are displayed on the display medium. Timing P indicates a timing at which the first images 101 and 103 stop being displayed on the display medium. The first images 101 and 103, and the second images 102 and 104 are visually recognized by an occupant as virtual images when the display medium is a HUD.

Further, in FIGS. 3A to 8B, the first images 101 and 103, and the second images 102 and 104 are for example, traffic-sign type images, on which the speed limit is indicated at each center. For example, the first image 101 is an image indicating that the speed limit (the first speed limit) is 60 km/h. For example, the second image 102 is an image indicating that the speed limit (the second speed limit) is 50 km/h. For example, the first image 103 is an image indicating that the speed limit (the first speed limit) is 50 km/h. For example, the second image 104 is an image indicating that the speed limit (the second speed limit) is 60 km/h. The first speed limit corresponds to the speed limit of the first road section and the second speed limit corresponds to the speed limit of the second road section.

Specific Examples 1

Figure 3A:
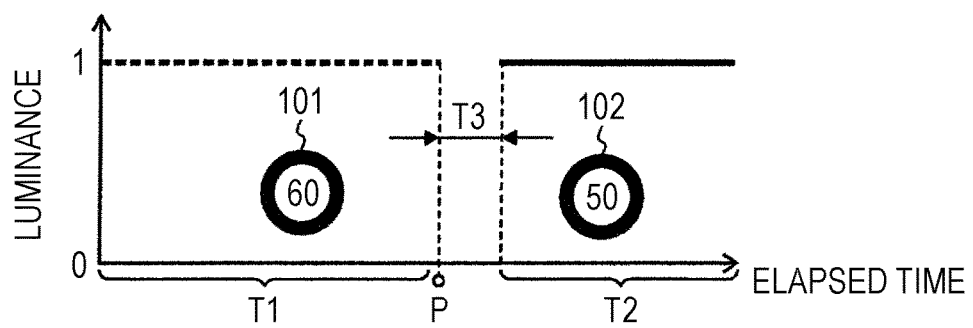
FIGS. 3A to 3C are diagrams for explaining specific examples 1 of switch of image display according to embodiment 1 of the present disclosure.
Figure 3B:
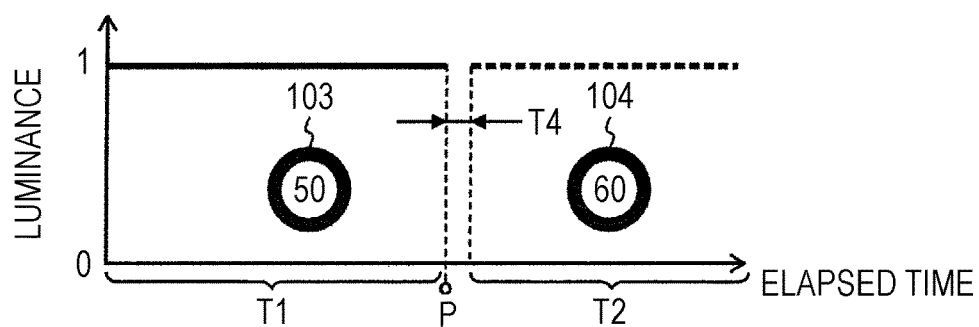
Figure 3C:
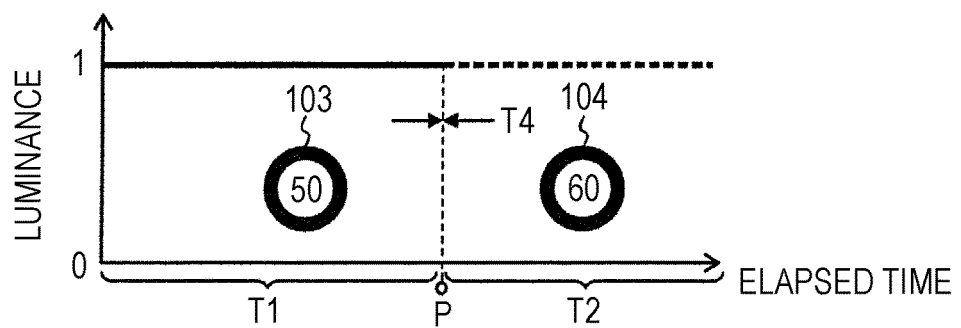

Specific examples 1 are described with reference to FIGS. 3A to 3C. FIG. 3A is a diagram for explaining a specific example of the switch of the control by the first switching method. FIG. 3B is a diagram for explaining a specific example of the switch of the control by the second switching method.

First, the specific example of the switch of the control by the first switching method is described with reference to FIG. 3A. FIG. 3A serves to describe the specific example of the switch of the control, which is performed when it is determined in the control unit 202 that the necessity to increase the conspicuity of the notification of the change in the speed limit is high.

During the time T1, the control unit 202 controls the display unit 30 so that the display unit 30 generates a predetermined image that represents the first image 101 when displayed on the display medium, and causes the predetermined image to be displayed on the display medium at a predetermined luminance. Accordingly, the first image 101 is displayed on the display medium.

After that, when the vehicle enters the second road link where the speed limit is 50 km/h and it is determined in accordance with the vehicle information that the necessity to increase the conspicuity of the notification of the change in the speed limit is high, the control unit 202 controls the display unit 30 so that the above-described display onto the display medium is stopped at the timing P by stopping generating the predetermined image that represents the first image 101. Accordingly, the first image 101 stops being displayed on the display medium at the timing P.

Then, after a lapse of time T3, which is set in advance and 0.5 or one second for example, the control unit 202 controls the display unit 30 so that the display unit 30 generates a predetermined image that represents the second image 102 when displayed on the display medium and causes the display medium to display the predetermined image at a predetermined luminance, which is for example, the same as the luminance of the first image 101. Accordingly, the second image 102 is displayed on the display medium. The control unit 202 may control the display unit 30 so that the display unit 30 reads the predetermined image representing the second image 102 generated in advance from a predetermined storage device and causes the predetermined image to be displayed at the predetermined luminance.

Thus, when the necessity to increase the conspicuity of the notification of the change in the speed limit is high, the control unit 202 controls the display unit 30 so that the second image 102 is displayed on the display medium after the certain time T3 has elapsed after the first image 101 had disappeared on the display medium. Accordingly, the switch of the image is more conspicuous and the driver may recognize the switch of the image more easily. For example, the driver may feel the switch of the image even when not gazing at the display medium.

Next, the specific example of the switch of the control by the second switching method is described with reference to FIG. 3B. FIG. 3B serves to describe the specific example of the switch of the control, which is performed when it is determined in the control unit 202 that the necessity to increase the conspicuity of the notification of the change in the speed limit is low.

During the time T1, the control unit 202 controls the display unit 30 so that the display unit 30 generates the predetermined image that represents the first image 103 when displayed on the display medium, and causes the predetermined image to be displayed on the display medium at a predetermined luminance. Accordingly, the first image 103 is displayed on the display medium.

After that, when the vehicle enters the second road link where the speed limit is 60 km/h and it is determined in accordance with the vehicle information that the necessity to increase the conspicuity of the notification of the change in the speed limit is not high, the control unit 202 controls the display unit 30 so that the display unit 30 stops the above-described display onto the display medium at the timing P by stopping generating the predetermined image that represents the first image 103. Accordingly, the first image 103 stops being displayed on the display medium at the timing P.

Then, after a lapse of time T4, which is set in advance and is for example, equal to or more than zero and less than the time T3, the control unit 202 controls the display unit 30 so that the display unit 30 generates the predetermined image that represents the second image 104 when displayed on the display medium, and causes the predetermined image to be displayed on the display medium at the predetermined luminance. Accordingly, the second image 104 is displayed on the display medium.

It is generally said that a critical flicker frequency (CFF), which is a critical frequency of the brightness and darkness that a human being can sense ranges from 30 to 40 Hz. The time T4 may be set to a value equal to or smaller than 20 msec for example, on the basis of the CFF. The first image 103 may be immediately switched to the second image 104 by setting the time T4 to zero as illustrated in FIG. 3C. Setting the time T4 to zero may further reduce the visual hindrance that the switch of the image brings to the driver. That is, the time T4 is equal to or more than zero and less than the time T3.

Although it is described above that when the speed limit remains unchanged even after the switch of the road section, the control unit 202 need not switch the control, the process may be performed in the manner similar to the above-described case where the necessity to increase the conspicuity of the notification is not high, such as the case where the time T4 is set to zero. When the speed limit remains unchanged even after the road section has been switched, the process may be performed in another processing method and the processing method does not limit the scope of the present disclosure.

Thus, when the necessity to increase the conspicuity of the notification is not high, the second image 104 is displayed after the certain time T4 has elapsed after the first image 103 had disappeared. Thus, compared to the case where the necessity to increase the conspicuity of the notification is high, the switch of the image is less conspicuous and the driver is less likely to feel visually hindered by the switch of the image.

The timing at which the vehicle enters the second road section from the first road section and the timing P are desirably simultaneous. When these timings are simultaneous, the driver can be informed of the change in the information on the speed limit in real time. In the present disclosure, however, the timing at which the vehicle enters the second road section from the first road section and the timing P need not necessarily be simultaneous and a difference of given time is allowable between the timings while not limiting the scope of the present disclosure. This is also applicable to the specific examples described below.

Specific Examples 2

Figure 4A:
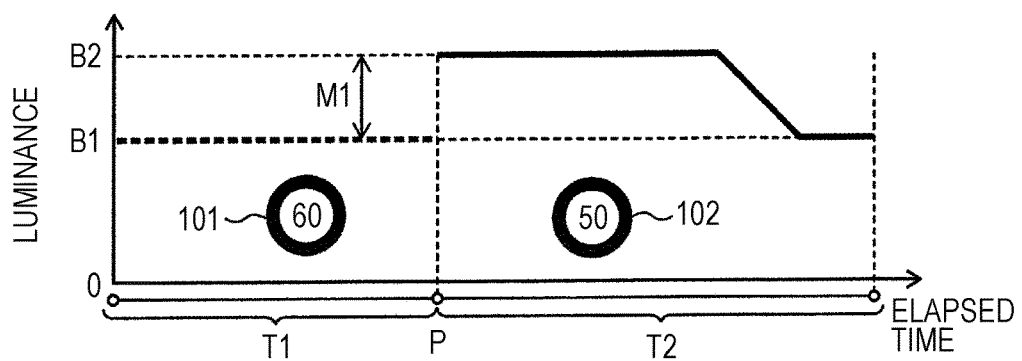
FIGS. 4A and 4B are diagrams for explaining specific examples 2 of the switch of the image display according to embodiment 1 of the present disclosure.
Figure 4B:
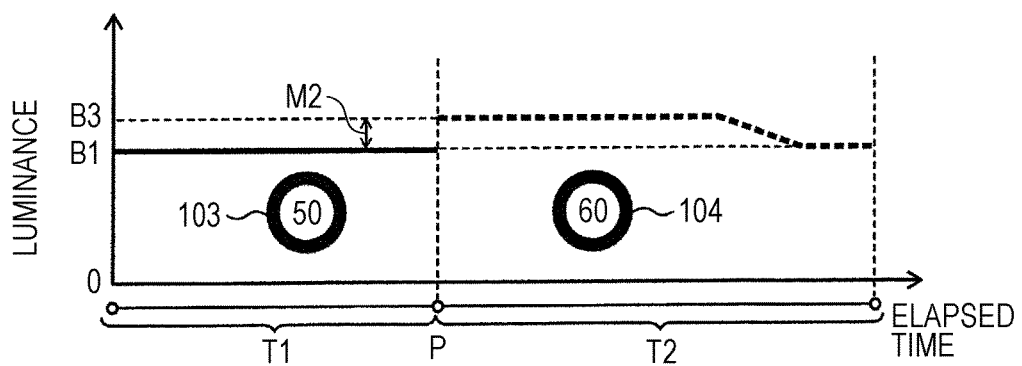

Specific examples 2 are described with reference to FIGS. 4A and 4B. FIG. 4A is a diagram for explaining a specific example of the switch of the control by the first switching method. FIG. 4B is a diagram for explaining a specific example of the switch of the control by the second switching method.

First, the specific example of the switch of the control by the first switching method is described with reference to FIG. 4A. FIG. 4A serves to describe the specific example of the switch of the control, which is performed when it is determined in the control unit 202 that the necessity to increase the conspicuity of the notification of the change in the speed limit is high.

During the time T1, the control unit 202 controls the display unit 30 so that the display unit 30 generates the predetermined image that represents the first image 101 when displayed on the display medium, and causes the predetermined image to be displayed on the display medium at a first luminance B1. Accordingly, the first image 101 is displayed on the display medium.

After that, when the vehicle enters the second road link where the speed limit is 50 km/h and it is determined in accordance with the vehicle information that the necessity to increase the conspicuity of the notification of the change in the speed limit is high, the control unit 202 controls the display unit 30 so that the display unit 30 stops the above-described display onto the display medium at the timing P by stopping generating the predetermined image that represents the first image 101. Accordingly, the first image 101 stops being displayed on the display medium at the timing P.

Further, the control unit 202 controls the display unit 30 so that the display unit 30 generates the predetermined image that represents the second image 102 when displayed on the display medium, and causes the predetermined image to be displayed on the display medium at a second luminance B2, which differs from the first luminance B1 by an absolute value M1. Accordingly, the second image 102 is displayed on the display medium. In FIG. 4A, as an example, the second luminance B2 has a value larger than the value of the first luminance B1. The absolute value M1 is a value larger than an absolute value M2 of the case where the necessity to increase the conspicuity of the notification of the change in the speed limit is not high, which is described below.

Then, after the display of the second image 102, the control unit 202 controls the display unit 30 so that the second luminance B2 gradually returns to the first luminance B1 from a predetermined timing.

Next, the specific example of the switch of the control by the second switching method is described with reference to FIG. 4B. FIG. 4B serves to describe the specific example of the switch of the control when it is determined in the control unit 202 that the necessity to increase the conspicuity of the notification of the change in the speed limit is not high.

During the time T1, the control unit 202 controls the display unit 30 so that the display unit 30 generates the predetermined image that represents the first image 103 when displayed on the display medium, and causes the predetermined image to be displayed on the display medium at the first luminance B1. Accordingly, the first image 103 is displayed on the display medium.

After that, when the vehicle enters the second road link where the speed limit is 60 km/h and it is determined in accordance with the vehicle information that the necessity to increase the conspicuity of the notification of the change in the speed limit is not high, the control unit 202 controls the display unit 30 so that the display unit 30 stops the above-described display onto the display medium at the timing P by stopping generating the predetermined image that represents the first image 103. Accordingly, the first image 103 stops being displayed on the display medium at the timing P.

Further, the control unit 202 controls the display unit 30 so that the display unit 30 generates the predetermined image that represents the second image 104 when displayed on the display medium, and causes the predetermined image to be displayed on the display medium at a third luminance B3, which differs from the first luminance B1 by the absolute value M2. Accordingly, the second image 104 is displayed on the display medium. In FIG. 4B, as an example, the third luminance B3 has a value larger than the value of the first luminance B1 and smaller than the value of the second luminance B2. The absolute value M2 is a value smaller than the above-described absolute value M1.

Then, after the display of the second image 104, the control unit 202 controls the display unit 30 so that the third luminance B3 gradually returns to the first luminance B1 from a predetermined timing.

Thus, when the necessity to increase the conspicuity of the notification of the change in the speed limit is high, in the switch from the first image 101 to the second image 102 on the display medium, the degree of the change in the luminance is large, compared to the case where the necessity to increase the conspicuity of the notification of the change in the speed limit is not high. Thus, the switch of the image is more conspicuous and the driver may recognize the switch of the image more easily. For example, the driver may feel the switch of the image even when not gazing at the display medium. In contrast, when the necessity to increase the conspicuity of the notification of the change in the speed limit is not high, in the switch from the first image 103 to the second image 104 on the display medium, the degree of the change in the luminance is small, compared to the case where the necessity to increase the conspicuity of the notification of the change in the speed limit is high. Thus, compared to the case where the necessity to increase the conspicuity of the notification of the change in the speed limit is high, the switch of the image is less conspicuous and the driver is less likely to feel visually hindered by the switch of the image.

Although the case in which both the second luminance B2 and the third luminance B3 are larger than the first luminance B1 is described above as an example, the luminance is not limited thereto. That is, in the present specific examples, as long as the condition that the absolute value M2 is smaller than the absolute value M1 is satisfied, the second luminance B2 or the third luminance B3 may be the same as the first luminance B1 or may be smaller than the first luminance B1.

Specific Examples 3

Figure 5A:
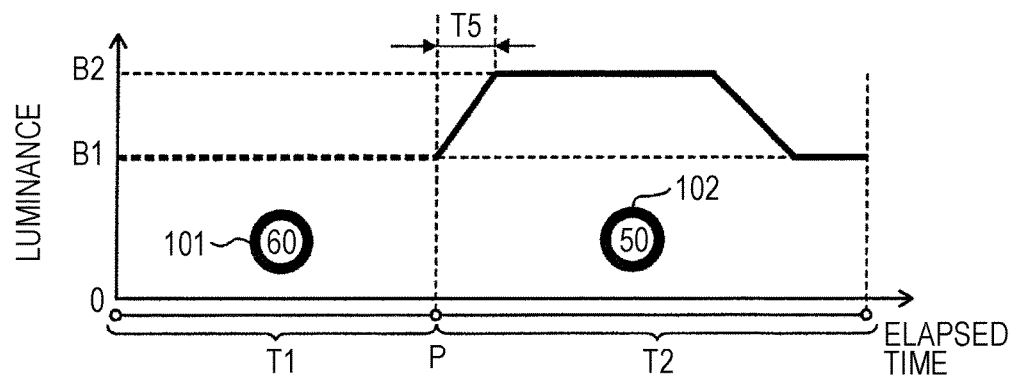
FIGS. 5A and 5B are diagrams for explaining specific examples 3 of the switch of the image display according to embodiment 1 of the present disclosure.
Figure 5B:
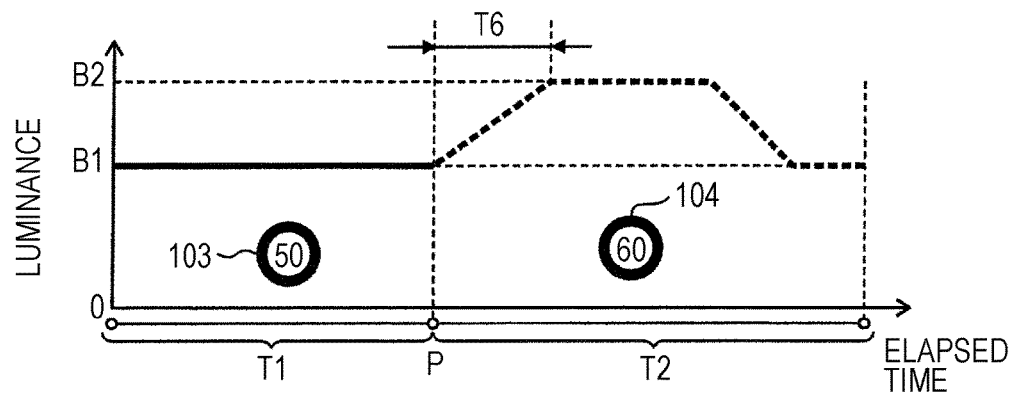

Specific examples 3 are described with reference to FIGS. 5A and 5B. FIG. 5A is a diagram for explaining a specific example of the switch of the control by the first switching method. FIG. 5B is a diagram for explaining a specific example of the switch of the control by the second switching method.

First, the specific example of the switch of the control by the first switching method is described with reference to FIG. 5A. FIG. 5A serves to describe the specific example of the switch of the control, which is performed when it is determined in the control unit 202 that the necessity to increase the conspicuity of the notification of the change in the speed limit is high.

During the time T1, the control unit 202 controls the display unit 30 so that the display unit 30 generates the predetermined image that represents the first image 101 when displayed on the display medium, and causes the predetermined image to be displayed on the display medium at the first luminance B1. Accordingly, the first image 101 is displayed on the display medium.

After that, when the vehicle enters the second road link where the speed limit is 50 km/h and it is determined in accordance with the vehicle information that the necessity to increase the conspicuity of the notification of the change in the speed limit is high, the control unit 202 controls the display unit 30 so that the display unit 30 stops the above-described display onto the display medium at the timing P by stopping generating the predetermined image that represents the first image 101. Accordingly, the first image 101 stops being displayed on the display medium at the timing P.

Further, the control unit 202 controls the display unit 30 so that the display unit 30 generates the predetermined image that represents the second image 102 when displayed on the display medium, and causes the predetermined image to be displayed on the display medium by gradually increasing the luminance from the first luminance B1 to the second luminance B2 during time T5, which is set in advance. Accordingly, the second image 102 is displayed on the display medium. Although in FIG. 5A, as an example, the second luminance B2 has a value larger than the value of the first luminance B1, the second luminance B2 may have a value smaller than the value of the first luminance B1. The time T5 has a value smaller than the value of time T6 of the case where the necessity to increase the conspicuity of the notification of the change in the speed limit is not high, which is described below.

Then, after the display of the second image 102, the control unit 202 controls the display unit 30 so that the second luminance B2 gradually returns to the first luminance B1 from a predetermined timing.

Next, the specific example of the switch of the control by the second switching method is described with reference to FIG. 5B. FIG. 5B serves to describe the specific example of the switch of the control, which is performed when it is determined in the control unit 202 that the necessity to increase the conspicuity of the notification of the change in the speed limit is not high.

During the time T1, the control unit 202 controls the display unit 30 so that the display unit 30 generates the predetermined image that represents the first image 103 when displayed on the display medium, and causes the predetermined image to be displayed on the display medium at the first luminance B1. Accordingly, the first image 103 is displayed on the display medium.

After that, when the vehicle enters the second road link where the speed limit is 60 km/h and it is determined in accordance with the vehicle information that the necessity to increase the conspicuity of the notification of the change in the speed limit is not high, the control unit 202 controls the display unit 30 so that the display unit 30 stops the above-described display onto the display medium at the timing P by stopping generating the predetermined image that represents the first image 103. Accordingly, the first image 103 stops being displayed on the display medium at the timing P.

Further, the control unit 202 controls the display unit 30 so that the display unit 30 generates the predetermined image that represents the second image 104 when displayed on the display medium, and causes the predetermined image to be displayed on the display medium by gradually increasing the luminance from the first luminance B1 to the second luminance B2 during the time T6, which is set in advance. Accordingly, the second image 104 is displayed on the display medium. Although in FIG. 5B, as an example, the second luminance B2 has a value larger than the value of the first luminance B1, the second luminance B2 may have a value smaller than the value of the first luminance B1. The time T6 has a value larger than the value of the above-described time T5.

Then, after the display of the second image 104, the control unit 202 controls the display unit 30 so that the second luminance B2 gradually returns to the first luminance B1 from a predetermined timing.

Thus, when the necessity to increase the conspicuity of the notification of the change in the speed limit is high, the change in the luminance at the time of the switch from the first image 101 to the second image 102 on the display medium is abrupt, compared to the case where the necessity to increase the conspicuity of the notification of the change in the speed limit is not high. Accordingly, the switch of the image is more conspicuous and the driver may recognize the switch of the image more easily. For example, the driver may feel the switch of the image even when not gazing at the display medium. In contrast, when the necessity to increase the conspicuity of the notification of the change in the speed limit is not high, the change in the luminance at the time of the switch from the first image 103 to the second image 104 on the display medium is gentle, compared to the case where the necessity to increase the conspicuity of the notification of the change in the speed limit is high. Thus, compared to the case where the necessity to increase the conspicuity of the notification of the change in the speed limit is high, the switch of the image is less conspicuous and the driver is less likely to feel visually hindered by the switch of the image.

Specific Examples 4

Figure 6A:
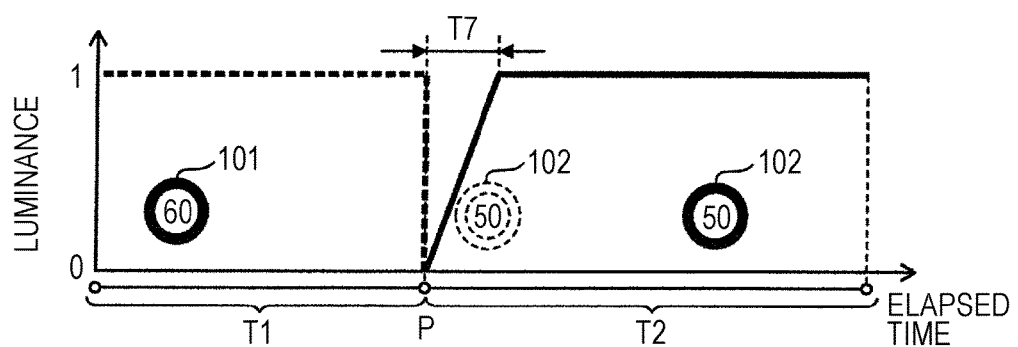
FIGS. 6A and 6B are diagrams for explaining specific examples 4 of the switch of the image display according to embodiment 1 of the present disclosure.
Figure 6B:
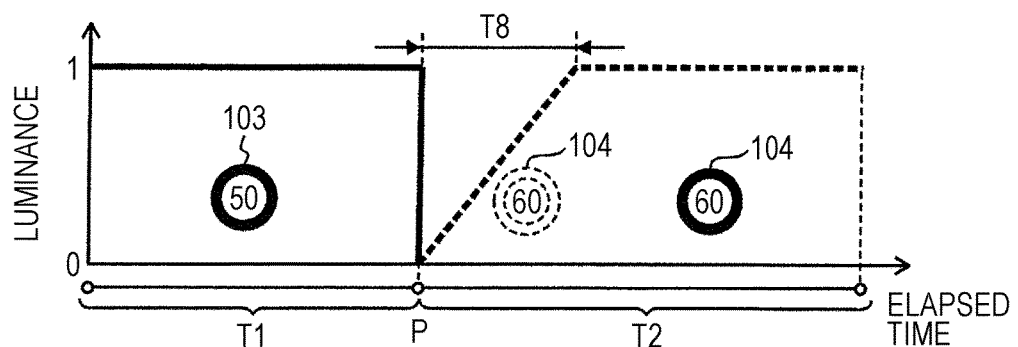

Specific examples 4 are described with reference to FIGS. 6A and 6B. FIG. 6A is a diagram for explaining a specific example of the switch of the control by the first switching method. FIG. 6B is a diagram for explaining a specific example of the switch of the control by the second switching method.

First, the specific example of the switch of the control by the first switching method is described with reference to FIG. 6A. FIG. 6A serves to describe the specific example of the switch of the control, which is performed when it is determined in the control unit 202 that the necessity to increase the conspicuity of the notification of the change in the speed limit is high.

During the time T1, the control unit 202 controls the display unit 30 so that the display unit 30 generates the predetermined image that represents the first image 101 when displayed on the display medium, and causes the predetermined image to be displayed on the display medium at a predetermined luminance. Accordingly, the first image 101 is displayed on the display medium.

After that, when the vehicle enters the second road link where the speed limit is 50 km/h and it is determined in accordance with the vehicle information that the necessity to increase the conspicuity of the notification of the change in the speed limit is high, the control unit 202 controls the display unit 30 so that the display unit 30 stops the above-described display onto the display medium at the timing P by stopping generating the predetermined image that represents the first image 101. Accordingly, the first image 101 stops being displayed on the display medium at the timing P.

Further, the control unit 202 controls the display unit 30 so that the display unit 30 generates the predetermined image that represents the second image 102 when displayed on the display medium, and causes the predetermined image to be displayed on the display medium by gradually increasing the luminance during time T7, which is set in advance. Accordingly, the second image 102 is displayed on the display medium. Although in FIG. 6A, as an example, the luminance of the second image 102 is increased to the same as the luminance of the first image 101, the luminance of the second image 102 may be increased to a predetermined luminance larger than the luminance of the first image 101. The time T7 has a value smaller than the value of time T8 of the case where the necessity to increase the conspicuity of the notification of the change in the speed limit is not high, which is described below, and is for example, larger than a value of 20 msec, which is set on the basis of the above-described CFF. That is, 20 msec<T7<T8.

Next, the specific example of the switch of the control by the second switching method is described with reference to FIG. 6B. FIG. 6B serves to describe the specific example of the switch of the control, which is performed when it is determined in the control unit 202 that the necessity to increase the conspicuity of the notification of the change in the speed limit is not high.

During the time T1, the control unit 202 controls the display unit 30 so that the display unit 30 generates the predetermined image that represents the first image 103 when displayed on the display medium, and causes the predetermined image to be displayed on the display medium at a predetermined luminance. Accordingly, the first image 103 is displayed on the display medium.

After that, when the vehicle enters the second road link where the speed limit is 60 km/h and it is determined in accordance with the vehicle information that the necessity to increase the conspicuity of the notification of the change in the speed limit is not high, the control unit 202 controls the display unit 30 so that the display unit 30 stops the above-described display onto the display medium at the timing P by stopping generating the predetermined image that represents the first image 103. Accordingly, the first image 103 stops being displayed on the display medium at the timing P.

Further, the control unit 202 controls the display unit 30 so that the display unit 30 generates the predetermined image that represents the second image 104 when displayed on the display medium, and causes the predetermined image to be displayed on the display medium by gradually increasing the luminance during the time T8, which is set in advance. Accordingly, the second image 104 is displayed on the display medium. Although in FIG. 6B, as an example, the luminance of the second image 104 is increased to the same as the luminance of the first image 103, the luminance of the second image 104 may be increased to a predetermined luminance larger than the luminance of the first image 103. The time T8 has a value larger than the value of the above-described time T7.

Thus, when the necessity to increase the conspicuity of the notification of the change in the speed limit is high, the change in the luminance at the time of the switch from the first image 101 to the second image 102 on the display medium is abrupt, compared to the case where the necessity to increase the conspicuity of the notification of the change in the speed limit is not high. Accordingly, the switch of the image is more conspicuous and the driver may recognize the switch of the image more easily. For example, the driver may feel the switch of the image even when not gazing at the display medium. In contrast, when the necessity to increase the conspicuity of the notification of the change in the speed limit is not high, the change in the luminance at the time of the switch from the first image 103 to the second image 104 on the display medium is gentle, compared to the case where the necessity to increase the conspicuity of the notification of the change in the speed limit is high. Thus, compared to the case where the necessity to increase the conspicuity of the notification of the change in the speed limit is high, the switch of the image is less conspicuous and the driver is less likely to feel visually hindered by the switch of the image.

Specific Examples 5

Figure 7A:
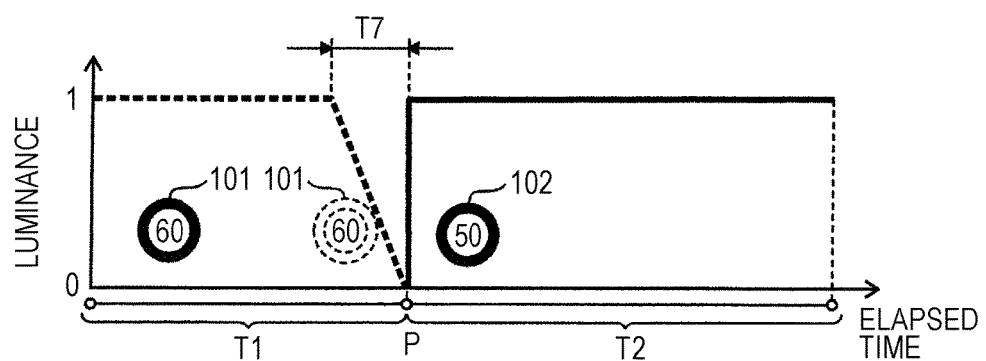
FIGS. 7A and 7B are diagrams for explaining specific examples 5 of the switch of the image display according to embodiment 1 of the present disclosure.
Figure 7B:
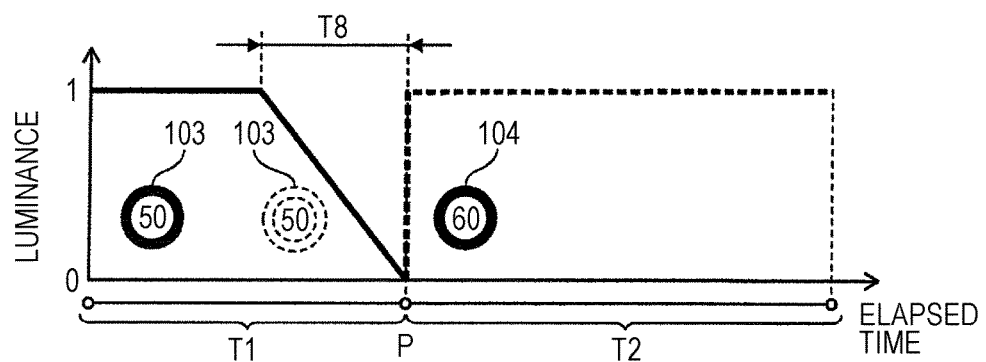

Specific examples 5 are described with reference to FIGS. 7A and 7B. FIG. 7A is a diagram for explaining a specific example of the switch of the control by the first switching method. FIG. 7B is a diagram for explaining a specific example of the switch of the control by the second switching method.

The present specific examples each describe a case where the acquisition unit 10 acquires the second speed limit information correlated with the second road link and the control unit 202 performs determination of the necessity to increase the conspicuity of the notification of the change in the speed limit at a predetermined timing in the time T1 in detail. The predetermined timing is for example, a few seconds or a dozen or so seconds before the timing at which the vehicle enters the second road link. The method of acquiring the second speed limit information includes acquiring the second road link connected to the first road link and the speed limit information in advance by referring to a map information database where connection information of the road links is stored while traveling on the first road link. When a plurality of road links are connected to the first road link, the information on the second road link may be acquired by acquiring the road link where the vehicle will travel from navigation information.

First, the specific example of the switch of the control by the first switching method is described with reference to FIG. 7A. FIG. 7A serves to describe the specific example of the switch of the control, which is performed when it is determined in the control unit 202 that the necessity to increase the conspicuity of the notification of the change in the speed limit is high.

During time included in the time T1 and before the time T7, the control unit 202 controls the display unit 30 so that the display unit 30 generates the predetermined image that represents the first image 101 when displayed on the display medium, and causes the predetermined image to be displayed on the display medium at a predetermined luminance. Accordingly, the first image 101 is displayed on the display medium.

After that, when it is determined that the necessity to increase the conspicuity of the notification of the change in the speed limit is high at a predetermined timing before the timing P, the control unit 202 controls the display unit 30 so that the display unit 30 stops the above-described display onto the display medium at the timing P by gradually decreasing the luminance during the time T7, which is set in advance, and stopping the display of the predetermined image that represents the first image 101. The time T7 has the value described in above-described specific examples 4. Accordingly, the first image 101 stops being displayed on the display medium at the timing P.

Further, in response to the entrance of the vehicle into the second road link where the speed limit is 50 km/h, the control unit 202 controls the display unit 30 so that the display unit 30 generates the predetermined image that represents the second image 102 when displayed on the display medium, and causes the predetermined image to be displayed on the display medium at the predetermined luminance. Accordingly, the second image 102 is displayed on the display medium. Although in FIG. 7A, as an example, the luminance of the second image 102 is the same as the luminance of the first image 101, the luminance of the second image 102 may be a predetermined luminance larger than the luminance of the first image 101.

Next, the specific example of the switch of the control by the second switching method is described with reference to FIG. 7B. FIG. 7B serves to describe the specific example of the switch of the control, which is performed when it is determined in the control unit 202 that the necessity to increase the conspicuity of the notification of the change in the speed limit is not high.

During time included in the time T1 and before the time T8, the control unit 202 controls the display unit 30 so that the display unit 30 generates the predetermined image that represents the first image 103 when displayed on the display medium, and causes the predetermined image to be displayed on the display medium at a predetermined luminance. Accordingly, the first image 103 is displayed on the display medium.

After that, when it is determined that the necessity to increase the conspicuity of the notification of the change in the speed limit is not high at a predetermined timing before the timing P, the control unit 202 controls the display unit 30 so that the display unit 30 stops the above-described display onto the display medium at the timing P by gradually decreasing the luminance during the time T8, which is set in advance, and stopping the display of the predetermined image that represents the first image 103. The time T8 has the value described in above-described specific examples 4. Accordingly, the first image 103 stops being displayed on the display medium at the timing P.

Further, in response to the entrance of the vehicle into the second road link where the speed limit is 60 km/h, the control unit 202 controls the display unit 30 so that the display unit 30 generates the predetermined image that represents the second image 104 when displayed on the display medium, and causes the predetermined image to be displayed on the display medium at the predetermined luminance. Accordingly, the second image 104 is displayed on the display medium. Although in FIG. 7B, as an example, the luminance of the second image 104 is the same as the luminance of the first image 103, the luminance of the second image 104 may be a predetermined luminance larger than the luminance of the first image 103.

Thus, when the necessity to increase the conspicuity of the notification of the change in the speed limit is high, the change in the luminance at the time of the switch from the first image 101 to the second image 102 on the display medium is abrupt, compared to the case where the necessity to increase the conspicuity of the notification of the change in the speed limit is not high. Accordingly, the switch of the image is more conspicuous and the driver may recognize the switch of the image more easily. For example, the driver may feel the switch of the image even when not gazing at the display medium. In contrast, when the necessity to increase the conspicuity of the notification of the change in the speed limit is not high, the change in the luminance at the time of the switch from the first image 103 to the second image 104 on the display medium is gentle, compared to the case where the necessity to increase the conspicuity of the notification of the change in the speed limit is high. Thus, compared to the case where the necessity to increase the conspicuity of the notification of the change in the speed limit is high, the switch of the image is less conspicuous and the driver is less likely to feel visually hindered by the switch of the image.

Specific Examples 6

Figure 8A:
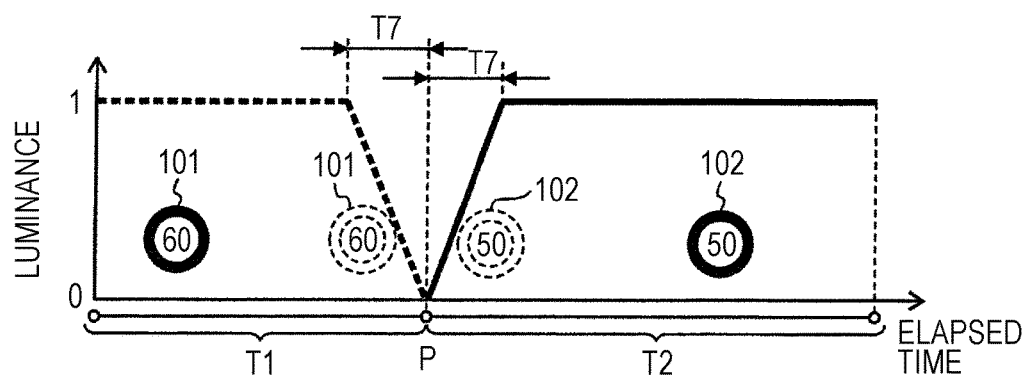
FIGS. 8A and 8B are diagrams for explaining specific examples 6 of the switch of the image display according to embodiment 1 of the present disclosure.
Figure 8B:
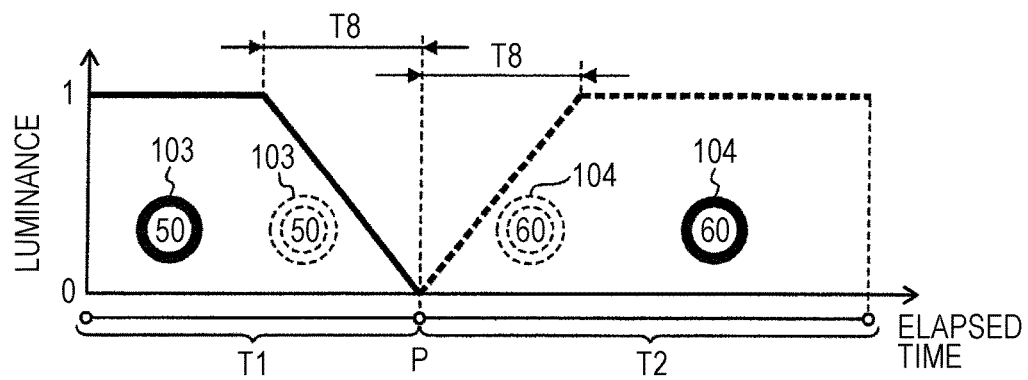

Specific examples 6 are described with reference to FIGS. 8A and 8B. The present specific examples are obtained by combining specific examples 4 and 5. FIG. 8A is a diagram for explaining a specific example of the switch of the control by the first switching method. FIG. 8B is a diagram for explaining a specific example of the switch of the control by the second switching method.

First, the specific example of the switch of the control by the first switching method is described with reference to FIG. 8A. FIG. 8A serves to describe the specific example of the switch of the control, which is performed when it is determined in the control unit 202 that the necessity to increase the conspicuity of the notification of the change in the speed limit is high.

During time included in the time T1 and before the time T7, the control unit 202 controls the display unit 30 so that the display unit 30 generates the predetermined image that represents the first image 101 when displayed on the display medium, and causes the predetermined image to be displayed on the display medium at a predetermined luminance. Accordingly, the first image 101 is displayed on the display medium.

After that, when it is determined at a predetermined timing before the timing P that the necessity to increase the conspicuity of the notification of the change in the speed limit is high, the control unit 202 controls the display unit 30 so that the display unit 30 stops the above-described display onto the display medium at the timing P by gradually decreasing the luminance and stopping the display of the predetermined image that represents the first image 101 during the time T7. Accordingly, the first image 101 stops being displayed on the display medium at the timing P.

Further, in response to the entrance of the vehicle into the second road link where the speed limit is 50 km/h, the control unit 202 controls the display unit 30 so that the display unit 30 generates the predetermined image that represents the second image 102 when displayed on the display medium, and causes the predetermined image to be displayed on the display medium by gradually increasing the luminance during the time T7. Accordingly, the second image 102 is displayed on the display medium.

In the present specific examples, the time T7 has a value smaller than the value of time T8 of the case where the necessity to increase the conspicuity of the notification of the change in the speed limit is not high, and is for example, larger than a value of 20 msec set on the basis of the above-described CFF. That is, 20 msec/2<T7<T8.

Next, the specific example of the switch of the control by the second switching method is described with reference to FIG. 8B. FIG. 8B serves to describe the specific example of the switch of the control, which is performed when it is determined in the control unit 202 that the necessity to increase the conspicuity of the notification of the change in the speed limit is not high.

During time included in the time T1 and before the time T8, the control unit 202 controls the display unit 30 so that the display unit 30 generates the predetermined image that represents the first image 103 when displayed on the display medium, and causes the predetermined image to be displayed on the display medium at a predetermined luminance. Accordingly, the first image 103 is displayed on the display medium.

After that, when it is determined at a predetermined timing before the timing P that the necessity to increase the conspicuity of the notification of the change in the speed limit is not high, the control unit 202 controls the display unit 30 so that the display unit 30 stops the above-described display onto the display medium at the timing P by gradually decreasing the luminance during the time T8 and stopping the display of the predetermined image that represents the first image 103. Accordingly, the first image 103 stops being displayed on the display medium at the timing P.

Further, in response to the entrance of the vehicle into the second road link where the speed limit is 60 km/h, the control unit 202 controls the display unit 30 so that the display unit 30 generates the predetermined image that represents the second image 104 when displayed on the display medium, and causes the predetermined image to be displayed on the display medium by gradually increasing the luminance during the time T8. Accordingly, the second image 104 is displayed on the display medium.

Thus, when the necessity to increase the conspicuity of the notification of change in the speed limit is high, the change in the luminance at the time of the switch from the first image 101 to the second image 102 on the display medium is abrupt, compared to the case where the necessity to increase the conspicuity of the notification of the change in the speed limit is not high. Accordingly, the switch of the image is more conspicuous and the driver may recognize the switch of the image more easily. For example, the driver may feel the switch of the image even when not gazing at the display medium. In contrast, when the necessity to increase the conspicuity of the notification of the change in the speed limit is not high, the change in the luminance at the time of the switch from the first image 103 to the second image 104 on the display medium is gentle, compared to the case where the necessity to increase the conspicuity of the notification of the change in the speed limit is high. Thus, compared to the case where the necessity to increase the conspicuity of the notification of the change in the speed limit is high, the switch of the image is less conspicuous and the driver is less likely to feel visually hindered by the switch of the image.

The switch of the control by the first switching method and the second switching method corresponding to steps S105 and S106 in FIG. 2 are described above. Above-described specific examples 1 to 6 may be combined as desired.

As described above, according to the present embodiment, when the importance of the visual recognition of the speed limit information is high, that is, when the necessity to increase the conspicuity of the notification of the change in the speed limit is high, the switch of the image is more conspicuous and the driver may recognize the switch of the image more easily. Further, according to the present embodiment, when the importance of the visual recognition of the speed limit information is low, that is, when the necessity to increase the conspicuity of the notification of the change in the speed limit is not high, the switch of the image is inconspicuous and the driver is less likely to feel visually hindered by the switch of the image. Thus, according to the present embodiment, the visibility of the speed limit displayed on the display medium may be enhanced.

Although embodiment 1 of the present disclosure is described above, the present disclosure is not limited to above-described embodiment 1 and may be changed variously. Variations are described below.

<Variation 1>

Although in the above-described embodiment, the image that indicates the speed limit, which is for example, the first image or the second image, has a shape of a traffic sign type, the shape of the image is not limited thereto. Other examples of the image are described with reference to FIGS. 9A to 9D.

Figure 9A:
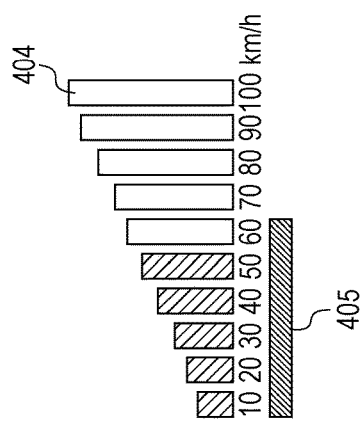
FIGS. 9A to 9D are diagrams that each illustrate an image display example according to embodiment 1 of the present disclosure.
Figure 9B:
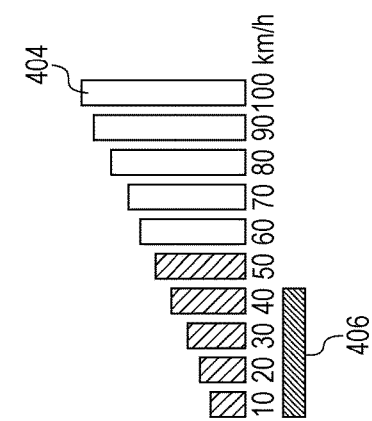

FIGS. 9A and 9B illustrate examples in which an image 402 and an image 403 are displayed near a circular speedometer 401, respectively. Each of the images 402 and 403 is shaped along the circumference of the speedometer 401. The image 402 illustrated in FIG. 9A indicates that the speed limit of the road link where the vehicle is traveling is 60 km/h. The image 403 illustrated in FIG. 9B indicates that the speed limit of the road link where the vehicle is traveling is 40 km/h.

Figure 9C:
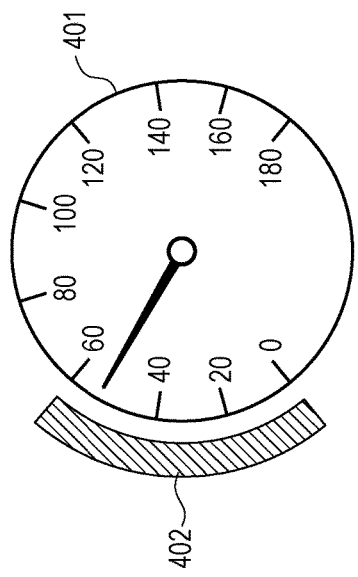
Figure 9D:
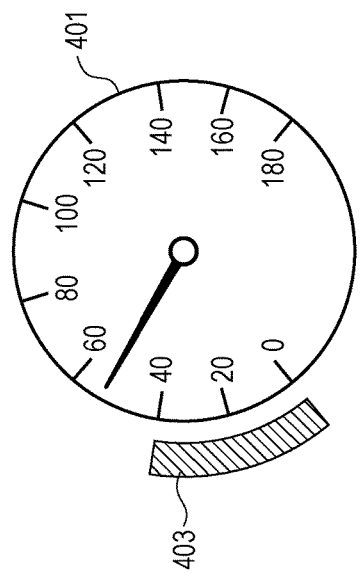

FIGS. 9C and 9D illustrate examples in which an image 405 and an image 406 are respectively displayed near a speedometer 404 made up of a plurality of bars with different lengths. Each of the images 405 and 406 is perpendicular to each of the bars of the speedometer 404. The image 405 illustrated in FIG. 9C indicates that the speed limit of the road link where the vehicle is traveling is 60 km/h. The image 406 illustrated in FIG. 9D indicates that the speed limit of the road link where the vehicle is traveling is 40 km/h.

<Variation 2>

Although there are two patterns in the above-described embodiment, that is, the case where the necessity to increase the conspicuity of the notification of the change in the speed limit is high, hereinafter referred to as the first pattern, and the case where the necessity to increase the conspicuity of the notification of the change in the speed limit is not high, hereinafter referred to as the second pattern, sorting into three or more patterns is also possible. For example, the first pattern and the second pattern may be further sorted into detailed patterns, which are a first pattern High-Necessity, a first pattern Low-Necessity, a second pattern High-Necessity, and a second pattern Low-Necessity. The first pattern High-Necessity is a pattern in which the necessity to increase the conspicuity of the notification of the change in the speed limit is higher than that in the first pattern Low-Necessity. The second pattern High-Necessity is a pattern in which the necessity to increase the conspicuity of the notification of the change in the speed limit is higher than that in the second pattern Low-Necessity. This case is described using specific examples 1. For example, when FIG. 3A indicates the first pattern Low-Necessity, a value larger than the value of the time T3 is used in the first pattern High-Necessity. Accordingly, compared to the first pattern Low-Necessity, when the necessity to increase the conspicuity of the notification of the change in the speed limit is higher, the switch of the image is more conspicuous and the driver may recognize the switch of the image more easily. When for example, FIG. 3B illustrates the second pattern High-Necessity, a value smaller than the value of the time T4 is used in the second pattern Low-Necessity. Accordingly, compared to the second pattern High-Necessity, when the necessity to increase the conspicuity of the notification of the change in the speed limit is not higher, the switch of the image is less conspicuous and the driver is less likely to feel visually hindered by the switch of the image. The present variation is applicable to the other specific examples.

<Variation 3>

Although in the above-described embodiment, the speed limit information is correlated with each road section in the map information in advance and stored in the predetermined storage device, and the acquisition unit 10 acquires the speed limit information from the predetermined storage device, the acquisition of the speed limit information is not limited thereto. For example, the speed limit information may be acquired through road-automobile communication or acquired from image information, such as a traffic sign. When the speed limit information is acquired from the image information, for example, the acquisition unit 10 acquires the image information of the traffic sign whose image is taken by a vehicle-mounted camera, which is a traffic sign indicating a speed limit. After that, the acquisition unit 10 or an image processing unit, which is not illustrated, performs image analysis on the above-described image information and extracts the speed limit information.

<Variation 4>

The method of the switch from the first image to the second image, that is, the first switching method in the case where the necessity to increase the conspicuity of the notification of the change in the speed limit is high is not limited to the methods described in above-described specific examples 1 to 6. For example, the second image may be displayed so as to be larger than the first image. As another example, the second image may be displayed in a color different from the color of the first image. As another example, the second image may be displayed so as to have a shape different from the shape of the first image. As another example, the second image may be displayed so as to have a predetermined motion. Accordingly, the driver may recognize the switch of the image more easily.

<Variation 5>

Although in the above-described embodiment, the control unit 202 controls the display unit 30 so that the display unit 30 generates the first image or the second image and causes the generated image to be displayed on the display medium, the control of the display is not limited thereto. For example, the control unit 202 may control the display unit 30 so that the display unit 30 reads the first image or the second image that has been generated in advance from a predetermined storage device and causes the read image to be displayed on the display medium.

The variations of embodiment 1 according to the present disclosure are described above. The above-described variations may be combined as desired.

Embodiment 2

Embodiment 2 of the present disclosure is described with reference to the drawings.

Figure 10:
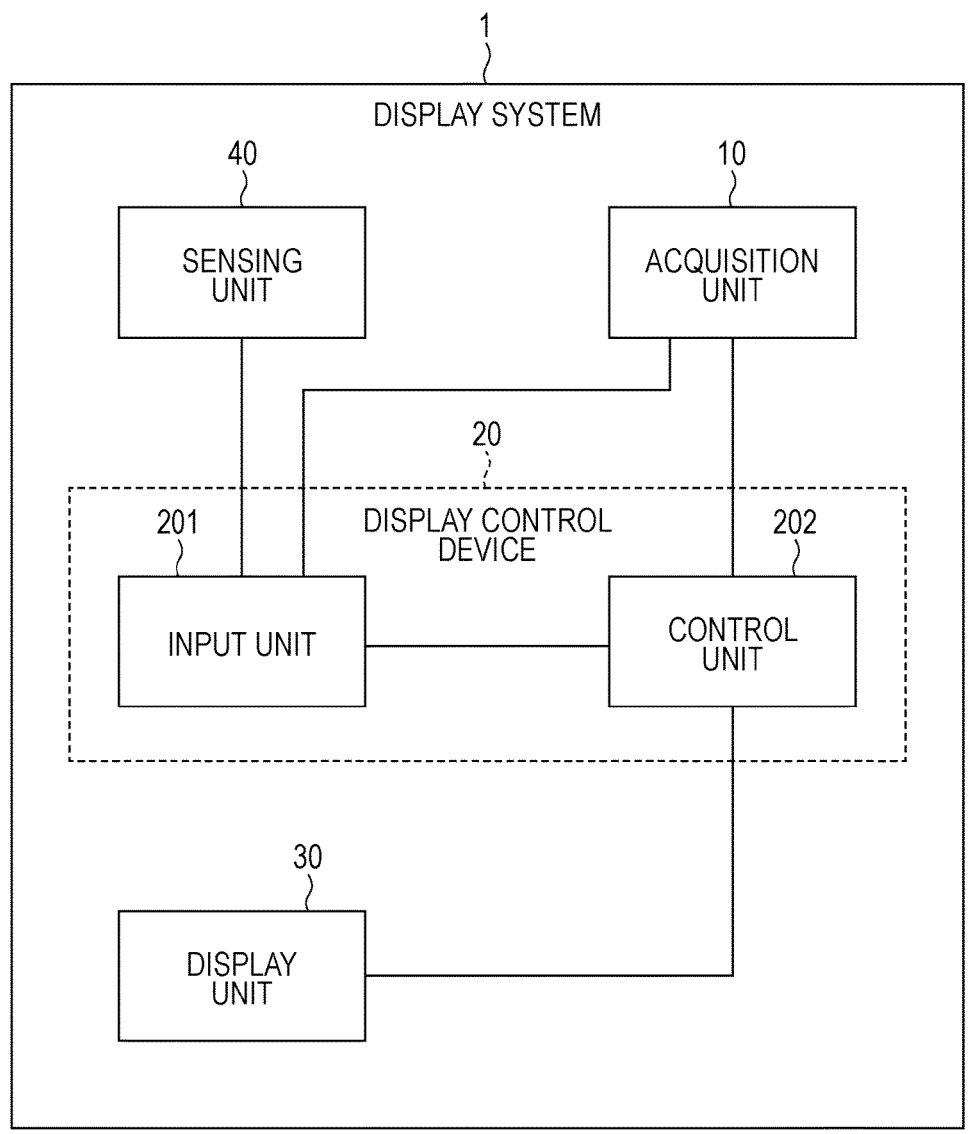
FIG. 10 is a block diagram that illustrates a configuration example of a display system according to embodiment 2 of the present disclosure.

A configuration example of a display system 1 according to the present embodiment is described with reference to FIG. 10. FIG. 10 is a block diagram of the configuration example of the display system 1 according to the present embodiment. Differences between the present configuration example and the configuration example according to embodiment 1 (see for example, FIG. 1) are described below.

The display system 1 further includes a sensing unit 40 that senses location information regarding a vehicle. Sensing result information, which indicates results of the sensing of the sensing unit 40, is input to a control unit 202 through an input unit 201.

An acquisition unit 10 acquires information on a speed limit of a road section. The speed limit information that the acquisition unit 10 has acquired is input to the control unit 202 through the input unit 201 or directly to the control unit 202 without passing through the input unit 201.

The control unit 202 performs a process, which is described below, in accordance with the sensing result information and the speed limit information described above.

When the sensing unit 40 has sensed that the vehicle is present in a first section, the control unit 202 controls a display unit 30 so that the display unit 30 generates a first predetermined image representing an image that indicates a first speed limit of the first section when displayed on the display medium, which has been acquired in the acquisition unit 10, and causes the first predetermined image to be displayed on the display medium.

When the sensing unit 40 has sensed move of the vehicle from the first section into a second section, the control unit 202 determines the relation, based on values, between the first speed limit and a second speed limit of the second section acquired by the acquisition unit 10. The "move of the vehicle" mentioned herein may be the move of the vehicle in the past or may be the move of the vehicle in the future. That is, sensing the move of the vehicle may be performed for the case where the vehicle has moved from one section into another or the case where the vehicle will move from one section into another.

When it is determined that the first speed limit is higher than the second speed limit, in accordance with vehicle information, the control unit 202 determines whether or not the necessity to increase the conspicuity of notification of the change (decrease in this case) in the speed limit is high. When the result of the determination indicates that the necessity to increase the conspicuity of the notification of the change in the speed limit is high, the control unit 202 performs switch by a first switching method from control for causing the display unit 30 to generate the first predetermined image and causing the first predetermined image to be displayed on the display medium to control for causing the display unit 30 to generate a second predetermined image representing the image that indicates the second speed limit when displayed on the display medium, and causing the second predetermined image to be displayed on the display medium. The timing of the switch mentioned herein may be a moment at which the vehicle moves from the first section into the second section or may be a moment before or after a lapse of predetermined time.

Further, when it is determined that the first speed limit is lower than the second speed limit, in accordance with vehicle information, the control unit 202 determines whether or not the necessity to increase the conspicuity of the notification of the change (increase in this case) in the speed limit is high. When the result of the determination indicates that the necessity to increase the conspicuity of the notification of the change in the speed limit is high, the control unit 202 performs switch by a second switching method, which is different from the first switching method, from the control for causing the display unit 30 to generate the first predetermined image and causing the first predetermined image to be displayed on the display medium to the control for causing the display unit 30 to generate the second predetermined image and causing the second predetermined image to be displayed on the display medium.

The present embodiment described above may offer advantages similar to those brought by embodiment 1.

In the present embodiment, the above-described variations of embodiment 1 may be combined and applied as desired.

The functions of each constituent of the display system 1 and the display control device 20 described above may be implemented by a computer program.

Figure 11:
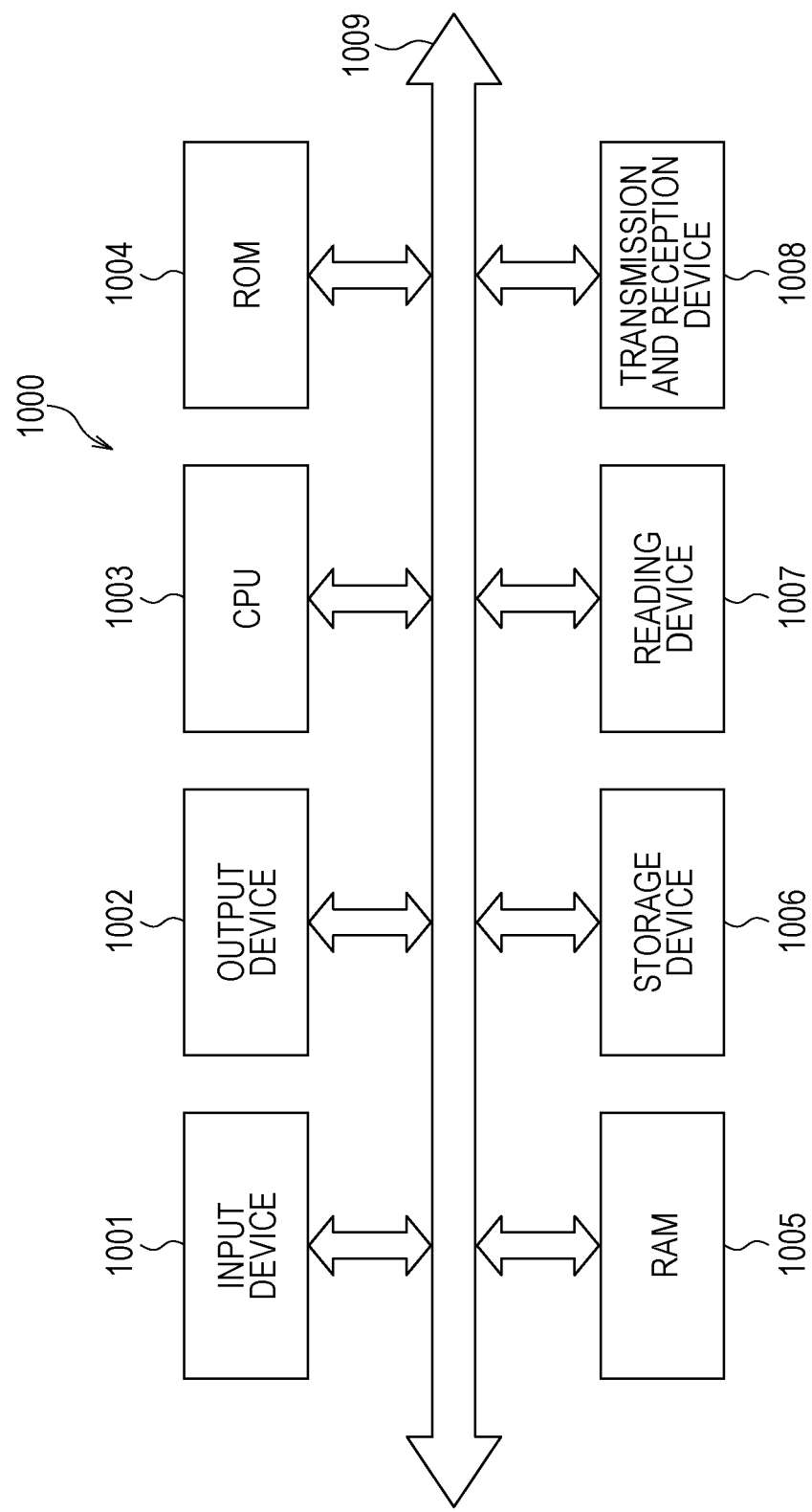
FIG. 11 is a block diagram that illustrates a hardware configuration example of the display system and a display control device according to an embodiment of the present disclosure.

FIG. 11 is a diagram that illustrates a hardware configuration of a computer 1000, which implements the functions of each constituent using a program. The computer 1000 includes an input device 1001, such as an input button or a touch pad, an output device 1002, such as a display or a speaker, a central processing unit (CPU) 1003, read-only memory (ROM) 1004, and random access memory (RAM) 1005. The computer 1000 further includes a storage device 1006, such as a hard disk device or a solid-state drive (SSD), a reading device 1007 that reads information from a storage medium, such as a digital versatile disc read-only memory (DVD-ROM) or universal serial bus (USB) memory, and a transmission and reception device 1008, which performs communication via a network. These constituents are connected through a bus 1009.

The reading device 1007 reads a program for implementing the functions of each of the above-described constituents from the storage medium where the program is stored, and causes the program to be stored in the storage device 1006. As another example, the transmission and reception device 1008 communicates with a server apparatus connected to the network and causes a program for implementing the functions of each of the above-described constituents, which has been downloaded from the server apparatus, to be stored in the storage device 1006.

After that, the CPU 1003 copies the program stored in the storage device 1006 to the RAM 1005, and the functions of each of the above-described constituents are implemented by sequentially reading commands included in the program from the RAM 1005 and executing the commands. In executing the program, the information obtained through the various processes described in each of the embodiments is stored in the RAM 1005 or the storage device 1006 to be utilized as desired.

The present disclosure is useful for a display control device, a projection device, a display control program, and a storage medium, which control display of information provided to a user who is for example an occupant of a vehicle or the like, or a user wearing a display device.

What is claimed is:

1. A display control device comprising:
   a processor; and
   a memory including a set of executable instructions that, when executed by the processor, causes the processor to perform operations including:
      receiving vehicle information including at least one of information on a vehicle, intra-vehicle information, and extra-vehicle information, and receiving information on a speed limit of a road where the vehicle travels;
      controlling generation of a predetermined image based on the vehicle information and the information on the speed limit, and outputting the predetermined image to a display medium,
   the predetermined image representing a presentation image that indicates the speed limit when displayed on the display medium,
   the predetermined image being generated as a first predetermined image representing a first presentation image that indicates a first speed limit;
      detecting a change in the speed limit of the road where the vehicle travels from the first speed limit to a second speed limit lower than the first speed limit based on the information on the speed limit of the road;
      after detecting the change in the speed limit, determining whether a necessity of providing a notification of the change in the speed limit on the display medium is in a first state or in a second state in accordance with the vehicle information; and
      when the processor determines that the necessity of notification is in the first state, causing the display on the display medium to be switched, by a first switching method, from the first predetermined image to a second predetermined image representing a second presentation image that indicates the second speed limit, and, when the processor determines that the necessity of notification is the second state, causing the display on the display medium to be switched, by a second switching method, different from the first switching method, from the first predetermined image to the second predetermined image,
   wherein
   the first switching method causes the second presentation image to be displayed on the display medium by generating the second predetermined image so that a luminance of the second predetermined image gradually increases to a first luminance or a second luminance larger than the first luminance during a first predetermined time after stopping the display of the first presentation image on the display medium, by stopping the generation of the first predetermined image of the first luminance,
   when the luminance of the second predetermined image gradually increases to the first luminance, the second switching method causes the second presentation image to be displayed on the display medium by generating the second predetermined image so that the luminance gradually increases to the first luminance during a second time after stopping the display of the first presentation image on the display medium by stopping the generation of the first predetermined image of the first luminance, where the first predetermined time exceeds 20 milliseconds, and the second time is longer than the first predetermined time, and
   when the luminance of the second predetermined image gradually increases to the second luminance, the second switching method causes the second presentation image to be displayed on the display medium by generating the second predetermined image so that the luminance gradually increases to the second luminance during the second time after stopping the display of the first presentation image on the display medium by stopping the generation of the first predetermined image of the first luminance, and the second time is longer than the first predetermined time.

2. The display control device according to claim 1, wherein
   when the vehicle information includes information that indicates a traveling speed of the vehicle, the operations further include:
   when the traveling speed of the vehicle is equal to or lower than the second speed limit, determining that the necessity of notification is the second state; and
   when the traveling speed of the vehicle is equal to or lower than the first speed limit and higher than the second speed limit, determining that the necessity of notification is the first state.

3. The display control device according to claim 1, wherein
   when the vehicle information includes information that indicates acceleration of the vehicle, the operations further include:
   when the vehicle decelerates, determining that the necessity of notification is the second state; and
   when the vehicle accelerates or when the vehicle travels at a constant speed, determining that the necessity of notification is the first state.

4. The display control device according to claim 1, wherein
   when the vehicle information includes information that indicates a relative speed to a preceding vehicle of the vehicle, the operations further include:
   when the relative speed is negative, determining that the necessity of notification is the second state; and
   when the relative speed is positive, determining that the necessity of notification is the first state.

5. The display control device according to claim 1, wherein
   when the vehicle information includes information that indicates a wakefulness degree of an occupant of the vehicle, the operations further include:
   when the wakefulness degree is equal to or larger than a predetermined value, determining that the necessity of notification is the second state; and when the wakefulness degree is smaller than the predetermined value, determining that the necessity of notification is the first state.

6. The display control device according to claim 1, wherein
when the vehicle information includes information on a notification to an occupant of the vehicle, the operations further include:
when the information indicates that the notification to the occupant of the vehicle is present, determining that the necessity of notification is the second state; and
when the information indicates that the notification to the occupant of the vehicle is not present, determining that the necessity of notification is the first state.

7. The display control device according to claim 1, wherein
when the vehicle information includes information that indicates an age of an occupant of the vehicle, the operations further include:
when the age is lower than a predetermined value, determining that the necessity of notification is the second state; and
when the age is equal to or higher than the predetermined value, determining that the necessity of notification is the first state.

8. The display control device according to claim 1, wherein
when the vehicle information includes information that indicates a driving skill of an occupant of the vehicle, the operations further include:
when the driving skill is high, determining that the necessity of notification is the second state; and
when the driving skill is low, determining that the necessity of notification is the first state.

9. The display control device according to claim 1, wherein
when the vehicle information includes information that indicates an attention attraction object present near the vehicle, the operations further include:
when the attention attraction object is present, determining that the necessity of notification is the second state; and
when the attention attraction object is not present, determining that the necessity of notification is the first state.

10. A projection device comprising:
a processor; and
a memory including a set of executable instructions that, when executed by the processor, causes the processor to perform operations including:
receiving vehicle information including at least one of information on a vehicle, intra-vehicle information, and extra-vehicle information, and receiving information on a speed limit of a road where the vehicle travels;
generating a predetermined image based on the vehicle information and the information on the speed limit, and outputting the predetermined image to a display medium,
the predetermined image representing a presentation image that indicates the speed limit when displayed on the display medium,
the predetermined image being generated as a first predetermined image representing a first presentation image that indicates a first speed limit;
detecting a change in the speed limit of the road where the vehicle travels from the first speed limit to a second speed limit lower than the first speed limit based on the information on the speed limit of the road;
after detecting the change in the speed limit, determining whether a necessity of providing a notification of the change in the speed limit on the display medium is in a first state or in a second state in accordance with the vehicle information; and
when the processor determines that the necessity of notification is in the first state, causing the display on the display medium to be switched, by a first switching method, from the first predetermined image to a second predetermined image representing a second presentation image that indicates the second speed limit, and, when the processor determines the necessity of notification is in the second state, causing the display on the display medium to be switched, by a second switching method different from the first switching method, from the first predetermined image to the second predetermined image,
wherein
the first switching method causes the second presentation image to be displayed on the display medium by generating the second predetermined image so that a luminance of the second predetermined image gradually increases to a first luminance or a second luminance larger than the first luminance during a first predetermined time after stopping the display of the first presentation image on the display medium, by stopping the generation of the first predetermined image of the first luminance,
when the luminance of the second predetermined image gradually increases to the first luminance, the second switching method causes the second presentation image to be displayed on the display medium by generating the second predetermined image so that the luminance gradually increases to the first luminance during a second time after stopping the display of the first presentation image on the display medium by stopping the generation of the first predetermined image of the first luminance, where the first predetermined time exceeds 20 milliseconds, and the second time is longer than the first predetermined time, and
when the luminance of the second predetermined image gradually increases to the second luminance, the second switching method causes the second presentation image to be displayed on the display medium by generating the second predetermined image so that the luminance gradually increases to the second luminance during the second time after stopping the display of the first presentation image on the display medium by stopping the generation of the first predetermined image of the first luminance, and the second time is longer than the first predetermined time.

11. A non-transitory storage medium that stores a display control program executed in a display control device of a display system, the display system acquiring vehicle information including at least one of information on a vehicle, intra-vehicle information, and extra-vehicle information and further acquiring information on a speed limit of a road where the vehicle travels, the display system further generating a predetermined image based on the vehicle information and the information on the speed limit and outputting the predetermined image to a display medium, the predetermined image representing a presentation image that indicates the speed limit when displayed on the display medium, the display control program causing a computer of the display control device to execute a process comprising:

generating a first predetermined image representing a first presentation image that indicates a first speed limit;

detecting a change in the speed limit of the road where the vehicle travels from the first speed limit to a second speed limit lower than the first speed limit based on the information on the speed limit of the road;

after detecting the change in the speed limit, determining whether a necessity of providing a notification of the change in the speed limit on the display medium is in a first state or in a second state in accordance with the vehicle information; and when the processor determines that the necessity of notification is in the first state, causing the display on the display medium to be switched, by a first switching method, from the first predetermined image to a second predetermined image representing a second presentation image that indicates the second speed limit, and, when the processor determines that the necessity of notification is the second state, causing the display on the display medium to be switched, by a second switching method different from the first switching method, from the first predetermined image to the second predetermined image, wherein the first switching method causes the second presentation image to be displayed on the display medium by generating the second predetermined image so that a luminance of the second predetermined image gradually increases to a first luminance or a second luminance larger than the first luminance during a first predetermined time after stopping the display of the first presentation image on the display medium by stopping the generation of the first predetermined image of the first luminance, when the luminance of the second predetermined image gradually increases to the first luminance, the second switching method causes the second presentation image to be displayed on the display medium by generating the second predetermined image so that the luminance gradually increases to the first luminance during a second time after stopping the display of the first presentation image on the display medium by stopping the generation of the first predetermined image of the first luminance, where the first predetermined time exceeds 20 milliseconds, and the second time is longer than the first predetermined time, and when the luminance of the second predetermined image gradually increases to the second luminance, the second switching method causes the second presentation image to be displayed on the display medium by generating the second predetermined image so that the luminance gradually increases to the second luminance during the second time after stopping the display of the first presentation image on the display medium by stopping the generation of the first predetermined image of the first luminance, and the second time is longer than the first predetermined time.

* * * * *